Feb. 8, 1955 C. A. PARKER 2,701,685

CALCULATING MECHANISM

Filed Sept. 29, 1949 12 Sheets-Sheet 1

INVENTOR.
Charles A. Parker

BY Eugene E. Stevens
ATTORNEY.

Feb. 8, 1955 C. A. PARKER 2,701,685

CALCULATING MECHANISM

Filed Sept. 29, 1949 12 Sheets-Sheet 2

INVENTOR.
Charles A. Parker
BY
Eugene E. Stevens
ATTORNEY.

CALCULATING MECHANISM

INVENTOR.
Charles A. Parker

BY
Eugene E. Stevens
ATTORNEY.

INVENTOR.
Charles A. Parker
BY
Eugene E. Stevens
ATTORNEY.

Feb. 8, 1955 C. A. PARKER 2,701,685

CALCULATING MECHANISM

Filed Sept. 29, 1949 12 Sheets-Sheet 5

INVENTOR.
Charles A. Parker
BY
Eugene E. Stevens
ATTORNEY.

Feb. 8, 1955 C. A. PARKER 2,701,685

CALCULATING MECHANISM

Filed Sept. 29, 1949 12 Sheets-Sheet 6

INVENTOR.
Charles A. Parker
BY
Eugene E. Stevens
ATTORNEY.

INVENTOR.
Charles A. Parker

Eugene E. Stevens
ATTORNEY.

INVENTOR.
Charles A. Parker
BY Eugene E. Stevens
ATTORNEY.

INVENTOR.
Charles A. Parker
By Eugene E. Stevens
ATTORNEY.

INVENTOR.
Charles A. Parker
BY
Eugene E. Stevens
ATTORNEY.

CALCULATING MECHANISM

INVENTOR.
Charles A. Parker
BY
Eugene E. Stevens
ATTORNEY.

Feb. 8, 1955 C. A. PARKER 2,701,685
CALCULATING MECHANISM
Filed Sept. 29, 1949 12 Sheets-Sheet 12
Fig. 22.
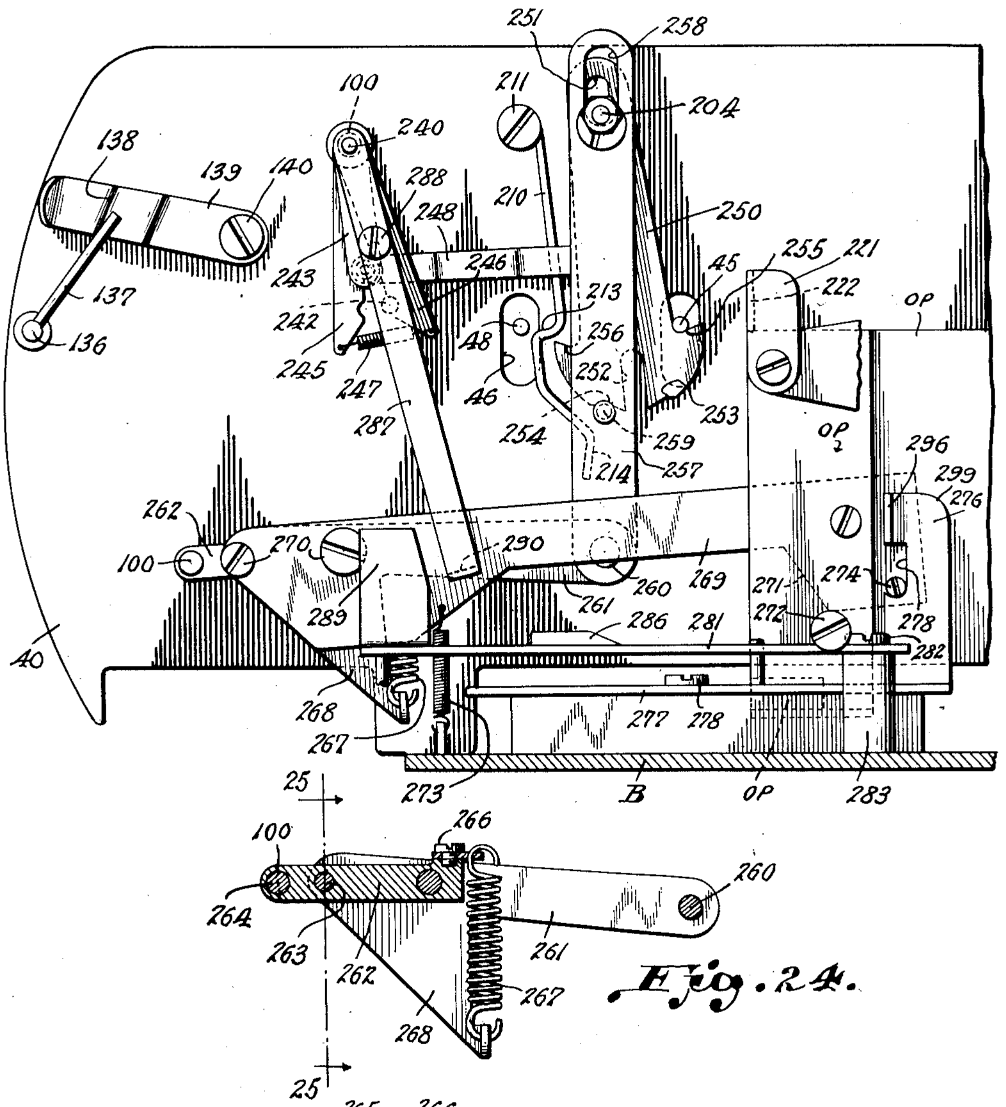
Fig. 22. Fig. 24.
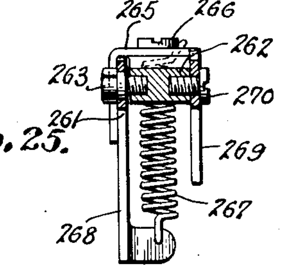
Fig. 25.
INVENTOR.
Charles A. Parker
BY Eugene E. Stevens
ATTORNEY.

United States Patent Office 2,701,685

Patented Feb. 8, 1955

2,701,685

CALCULATING MECHANISM

Charles A. Parker, Knoxville, Tenn., assignor, by mesne assignments, to Burroughs Corporation, a corporation of Michigan Application September 29, 1949, Serial No. 118,691

27 Claims. (Cl. 235—60.2)

This invention relates to calculating machines having calculating mechanism enabling the taking of a true algebraic total, whether positive or negative, directly from a register. In particular the invention deals with calculating mechanism utilizing at least two sets of register pinions, wherein one adds and the other subtracts the same entered item in the same computing operation.

A general object is to provide calculating mechanism which will enable true positive and true negative totals to be taken directly from a register without compensating for the errors introduced by change in the algebraic sign of the computations.

A more particular object is to provide calculating mechanism having two sets of register pinions, one acting as the complement of the other, with means governed by the algebraic sign in one register for automatically selecting one of the registers for totalling by total taking means common to both.

Another object is to provide calculating mechanism having two sets of independent register pinions and total taking means common to both, in which the total can be taken from either set of pinions selected by a means under control of both sets for determining the set to be totaled.

A further object is to provide calculating mechanism having means for taking the true algebraic total from either of two independently operated sets of register pinions having a total taking means common to both sets, without the necessity of a blank cycle of operation.

A still further object is to provide calculating mechanism having two sets of register pinions movable to one position for addition and to another position for subtraction, and automatic mechanism for selecting one set for total taking in which the highest tens transfer in either set controls the selecting mechanism when the pinions are positioned for subtraction but not when they are positioned for addition.

Still another object is to provide calculating mechanism having means for taking the true algebraic total from either of two independently operated sets of register pinions having a total taking means common to both, wherein means cooperating with the total taking means automatically restores to zero position the pinions of the set not functioning in taking the total.

A further object is to provide calculating mechanism having two independent sets of register pinions controlled by mechanism for shifting the sets simultaneously, one to compute additively and the other to compute subtractively, wherein the shifting mechanism, in operating, establishes a spring tension normally urging the pinions in the direction in which they are shifted; and including means selectively operative to prevent shifting of either set in a selected direction when the other set is shifted.

An object concomitant to the preceding is to provide means for imposing on the shifting means an extraneous force effective to move a prevented set of the pinions against its spring urge in an opposite direction to compute oppositely to the manner in which it normally would compute if not prevented.

A still further object is to provide calculating mechanism including racks and pinions, in which the pinions are yieldably brought into and out of mesh with the racks by spring means instead of positive drive.

Another object is to provide calculating mechanism in which register pinions are brought yieldably into mesh with racks through the urge of spring means and are automatically releasably latched in mesh during their operation.

A further object is to provide calculating mechanism in which register pinions are automatically latched in mesh with racks and are spring urged out of mesh, whereby unlatching of the pinions automatically effects unmeshing of the pinions under the urge of the spring means.

It is also an object to provide calculating mechanism having two independent sets of register pinions adapted for addition and subtraction, each of which has a zero position identical to the other, and a total taking means common to both sets of pinions; wherein selective means under control of both sets of pinions operates to condition the total taking means to bring both sets of pinions to their zero position in a total taking cycle.

Still another object is to provide calculating mechanism in which independent registers computing in unison are enabled to transfer their computations to each other without the interposition of a spacing stroke or any other intermediary.

Another object is to provide calculating mechanism in which independent registers computing in unison can be conditioned to total or subtotal without the necessity of a spacing stroke and wherein they can transfer their computations to each other in the same total or subtotal operation.

Still another object is to provide calculating mechanism in which independent registers computing in unison are enabled to transfer their entire computation to each other in the stroke following a computing operation in which both registers operated in unison.

Other and incidental objects will be apparent from the following description taken in conjunction with the accompanying drawings.

Briefly described, this invention comprises calculating mechanism that is adapted for use in any calculating machine in which a mechanism is actuated from an operating member that moves in a cycle at each actuation, whether the cycle be reciprocating, oscillating, or rotary. The calculating mechanism includes two independent sets of register pinions adapted for operation in unison whereby one set of pinions adds and the other set of pinions simultaneously subtracts the same item in a computing cycle of the machine. Tens transfer mechanism is provided and also reset mechanism for restoring to normal condition all elements of the transfer mechanism which function in effecting transfers during a computing operation. The reset mechanism is adapted for operation independently of the machine's operating member by extraneous motive power provided by springs. This independent operation of the reset mechanism is effected from the actuation of a control element, such as a total key or a subtotal key, which is movable to condition the machine for totaling or subtotaling; and the reset mechanism, when so controlled, operates before the start of the totaling or subtotaling cycle. The mechanism includes totaling means that is common to both sets of pinions, and incorporates selector means automatically operative in response to conditions existing in either set of pinions to select the register from which a total or subtotal is taken. The position of the selector means exercises a control over the operation of mechanism that is employed to shift the sets of pinions into and from mesh with calculator actuator racks. The mechanism for shifting sets of pinions operates during a computing cycle of the operating member to move the two sets of pinions oppositely into or from mesh with their racks. The shifting mechanism incorporates spring means by which the pinions are adapted to be yieldingly moved either into mesh or out of mesh with their respective racks. The position of an element of the shifting mechanism determines the effective directional bias of the spring means. This element normally is moved to its various positions by driving connection with the operating member, but is adapted for control by actuator means influenced by operation of either the total or subtotal key of the machine. The position of the selector means influences the disposition of the mechanism which selectively is employed to prevent shifting of a selected set of pinions in a predetermined direction. This preventing mechanism is controlled through instrumentalities that are brought into action by operation of either the total or subtotal key. The disposition of the preventing mechanism, as determined by the selector means, automatically disables that set of pinions which is not intended to function in taking a total or subtotal, so that the other set of pinions is free to shift into add position, whereby the total or subtotal always is taken from the add side of the register selected for total or subtotal taking. The selection of a set of pinions from which a total or subtotal is to be taken is governed by a coincidence of at least two operating conditions in either set of pinions. This coincidence is predetermined and normally is incapable of simultaneous occurrence in both sets of pinions, although the coincidence is the same for both sets. Mechanism is provided for operation under the influence of the total key of the machine to condition the total taking means so that it operates to bring both sets of pinions to their zero position in the same cycle in which the total is taken. This zero point restoration is accomplished normally in the set of pinions from which the total is taken during the first half of the total taking cycle, as in conventional practice. The restoration to zero point for the other set of pinions is accomplished by transferring additively into that set the final accumulation made by the total producing set of pinions before its restoration to zero position. The transfer is effected by shifting the pinions of the receiving set into add position whereby they accumulate additively during the second half of the cycle the computation transferred from the total producing set of pinions. Shifting movement of the transfer receiving set of pinions is effected against the bias of the normal pinion shifting means and by the application of extraneous force provided by the operating member, this extraneous force being superimposed upon the pinion shifting mechanism.

For purposes of compliance with the statute, and without restriction to the specific form, the following disclosure constitutes a practical embodiment of the invention by which its basic principles are reduced to practice.

In the drawings:

Fig. 22 is an elevation similar to Fig. 21, but illustrating the position of the parts at the conclusion of the first half of a totaling cycle;

Fig. 24 is a view of detail connected with the mechanism of Fig. 22;

Fig. 25 is a section substantially on the line 25—25 of Fig. 24;

Figure 1:
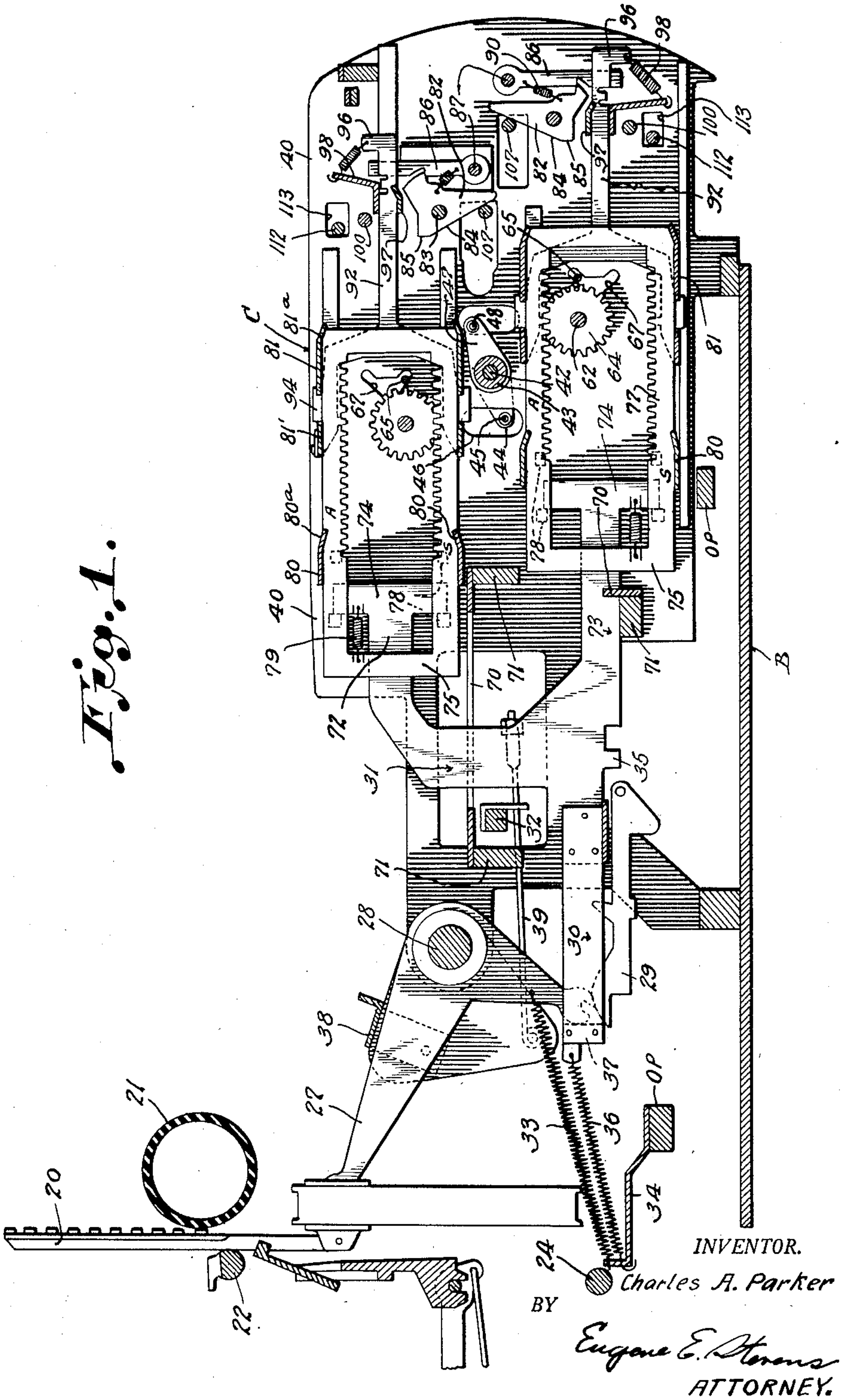
Fig. 1 is a vertical section longitudinally through the calculating mechanism of the machine in which the invention is incorporated.

In mathematical addition and subtraction amounts added continue to increase the total of an accumulation while amounts subtracted decrease the accumulative total, the result or total being the difference between the added and subtracted figures. The result will be of a positive amount above zero when added amounts are of greater value than subtracted amounts. If the amounts subtracted are of greater value than amounts added, the results will be an accumulation or addition of the difference, in the value of these amounts below zero. When an amount or fraction thereof has reduced the added amounts to zero, further subtracted amounts are added to the accumulation on the negative side of the zero and are remembered as negative accumulation. As an example: 5 plus 4 equals 9, minus 6 equals 3, minus 7 equals 4 minus; at this point 3 of the 7 reduced 3 to 0 and the 4 remaining becomes an accumulation of 4 below zero, or negative 4; a further subtracted amount as minus 3 equals 7 minus; thus a further subtracted amount is added to the negative 4 but remembered as negative accumulation; a further added amount as plus 2 equals 5 minus; thus mathematically added amounts to a negative accumulation are really subtracted until the zero point is reached, after which added amounts are accumulated additively and subtracted amounts reduce the accumulative total. It can be seen that addition and subtraction increase and decrease the accumulation, in this order, when starting with an additive amount, until the zero point is reached, and then further subtracted amounts are really added and added amounts are really subtracted, which is the reverse of the order above zero. Thus, it appears that accumulation is basically additive above zero or below zero.

In mechanical calculating machines such as those constructed with racks and pinions operating in conjunction with printing typebars, and the pinions being operable under conditions for addition and also operable under conditions for subtraction, in which one condition rotates the pinions reversely to its rotation in the other condition; it would seem that a result or algebraic total to computations in such a set of pinions could be effected by shifting the conditions under which the pinions were being rotated in one direction so as to rotate the pinions in the other direction for the balance of the item being received by the pinions, when the amount was such as to cause the pinions to move to their zero position during the course of a computating operation of the machine. This would be the reverse direction of pinion rotation when the computed item began entering the pinions. As an example, let us suppose a set of pinions has been rotated additively to receive amounts that have totaled 25 and now an amount of 47 is being entered subtractively. Such an amount would bring each pinion to its zero position, and now while in that position if the pinions were conditioned to receive the balance of the item additively then the set of pinions would contain 22, the amount left after 25 of the 47 brought the pinions to their zero position. Hence, the pinions would contain 22, the true algebraic total, and the sign would have been signaled by change in direction of pinion rotation. Furthermore, it would be necessary for mathematical amounts to be received by the pinions rotating oppositely to the direction in which they were turning before being brought below their theoretical zero position, and the operation would have to remain as such until computation returned the pinions to or through their zero positions again. However, the machines in general use today do not permit such action of their pinions for many mechanical reasons. One such reason being that in the course of computation, with several pinions being revolved simultaneously and tens transfer action from one pinion to the next not being completed until the additional movement is given the pinions after they have received their normal item amount actuation, there does not generally exist that condition under which the pinions would all reach their true zero position in the actuating movement.

This mechanism herein described has been designed with the idea of providing within a machine, means that operates in a manner to give the results that would exist in pinions that could be operated as explained above. This has been done by using two sets of pinions to operate simultaneously during a cycle of operation in which one set operates reversely to the other, that is, when one adds an amount the other subtracts the amount. Thus, it follows that if both registers started from zero, one set of pinions would accumulate the value of the difference in the amounts if the value were above zero and the other set would accumulate the value of the difference in the amounts if the value were below zero; so that one set of pinions will contain the mathematical positive total of the amounts computed, if the accumulation was of positive sign. The other set of pinions will contain the negative mathematical total if the accumulation were of a negative sign. In one of the sets of pinions would be the true algebraic total of the accumulation. In either case the amount in one of the sets of pinions would be of positive character, but the particular set of pinions containing the positive total will always determine the sign of the mathematical total. In this arrangement in which one register contains the positive total, the other register will contain the complement of that amount. It also follows that in such mechanism the pinions are controlled or actuated from a zero position common to both sets of pinions and their actuators.

Since one set of pinions operating in the manner previously described would require but one total control element or key for total taking, a means has been provided herein by which a total taking element or key operates to take a total from either set of pinions containing the true algebraic total. Means are also provided for subtotal operation of the register containing the true total; that is, provisions are made for printing the true total of accumulations and still retaining the total within the pinions for further computing operations. This is done by suspending operation of the set of pinions containing the complement of the true total during the subtotaling operation.

During a totaling operation, not only is the accumulation within the pinions printed, but the pinions are restored to their zero position for further calculation. This is accomplished in this machine by totaling the set of pinions containing the true algebraic total in the usual manner for machines of this character. The other set of pinions containing the complement of the total is brought to zero position by additively transferring the total to that register, thereby turning these pinions to their true zero position. This transfer of the amount from the totaling set of pinions additively to the complementary set is all accomplished during the total taking cycle of the machine operation, so that both registers are clear to begin further computing during the following cycle of machine operation.

While these two sets of pinions accumulate reversely of one another, the pinions work in conjunction with control and selector mechanism by which the pinions automatically select the set for totaling that contains the true algebraic total, and also select the operating means whereby to zero both sets of pinions in a single operating cycle. This mechanism is embodied in a machine in which the usual blank cycle of operation before the total taking cycle is eliminated by a spring operated reset mechanism released by the total key, the pinions being removed from their racks by actuation of the total key and previous to release of the spring operated reset. The pinions and racks are of the structure in which tens transfer is achieved by an additional step movement of the racks. However, the mechanism does not necessarily need to be limited to registers of this type nor to machines having mechanism for eliminating the spacing stroke nor even to machines using similar register mechanism in both sets of pinions.

The structure disclosed herewith, incorporated in a calculating machine, makes it possible to list amounts for addition and amounts for subtraction, each amount entering the pinions in a cycle of machine operation. The depression of a single total key causes printing of the true algebraic total including a character to designate the sign of that total and restores both sets of pinions to their zero position in condition for further computation, all during a single total taking cycle immediately following a cycle of computation.

As herein disclosed, the invention is shown incorporated in the accounting machine comprising the subject matter of the copending application of Charles A. Parker and Clifton K. Rainey, Serial No. 99,081, filed June 14, 1949, and the copending application of Charles A. Parker, Serial No. 109,570, filed August 10, 1949, now Patent No. 2,646,928. Briefly described, the machine includes a plurality of adding type carriers or bars 20 movable vertically into and from printing position relative to a platen 21. The type bars in printing are struck by a hammer 22 triggered by cam means on a main drive shaft 24 rotatable in the machine frame by motor means, not shown, under the control of an operator. An operating member OP reciprocates horizontally in the main frame of the machine through one full cycle at each revolution of the drive shaft, there being an operating connection between the shaft and operating member. Each actuation of the motor means effects one complete rotation of the drive shaft and correspondingly moves the operating member OP through one full cycle between two limit positions in one of which it is at rest. When at rest, the operating member is at its rearmost limit of travel, as in Fig. 2.

Each type bar is moved to and from printing position by an individual bell crank lever 27 pivoted at 28 to oscillate in a vertical plane common to the type bar. The long arm of the lever is in operating connection with the lower end of the type bar and, in normal position with the type bar fully lowered out of printing position, the short arm of the lever is held by a latch 29 so that the lever cannot rock to lift the type bar. The latch is biased to engaged position and is releasable by the camming action of an extension 30 on an actuator slide 31 of the calculating unit C. A slide 31 is paired with each type bar and reciprocates horizontally in the vertical plane common to its associated type bar and bell crank lever. A restore bar 32 extends transversely across the leading edge portions of the slides and normally restrains them against forward movement towards the type bars under the urge of a contractile spring 33. One such spring is connected between the short arm of each bell crank lever 27 and a fixed element 34 of the operating member OP.

Each slide 31 has an abutment 35 that is engageable by key set stop pins, not shown, which determine the extent of forward travel of the slides. When the operating member OP is cycled, those slides permitted movement beyond zero position travel forward under the pull of a contractile spring 36; one such spring being connected between the front end of each slide extension 30 and the operating member element 34. The restore bar will have been moved ahead of the slides under propulsion of the operating element by the time those slides free to move beyond zero position begin their travel past that point. In the course of their forward travel their associated latches 29 are disengaged, whereupon the released bell crank levers 27 rock under the pull of their springs 33 to lift their corresponding type bars into printing position. The terminal portion of the short arm of each released bell crank lever engages behind an abutment 37 on the slide extension 30, so that the printing elevation of the type bar is determined by the point at which further forward travel of the slide is arrested.

At the conclusion of a printing operation the operating member OP moves rearwardly through the second half of its cycle back to its initial position of rest. During this movement the restore bar is retracted and carries back with it all advanced slides. The retracting slide extensions rock their associated bell crank levers and pull the type bars down out of printing position. When the slides come to rest at the end of their rearward travel a further rocking movement is given the bell crank levers to carry their short arm terminals rearwardly away from the slide extension abutments 37 for reengagement by the latches 29. This further movement is effected by a pull-down yoke 38 that straddles the long arms of the entire set of bell crank levers in an operating connection 39 with the restore bar.

The instrumentalities and the arrangement of parts thus far described in detail are those of the aforesaid Parker and Rainey application Serial No. 99,081, filed June 14, 1949, and are not a part of this invention except as they enter into the general combination. The present invention deals particularly with the register section of the calculating unit C.

*The register*

The register section is contained within the calculating unit frame. This frame comprises parallel side walls 40 having appropriate transverse connection and mounted on the bottom plate B of the main frame of the machine to extend longitudinally therein in rear of the platen and the type bar assembly. These walls journal a transverse concentric shaft assembly comprising an inner shaft 42 and an outer sleeve shaft 43 rotatable thereon. Cranks 44 fixedly secured on the inner shaft 42 exteriorly of the walls 40 support between them a transverse rod 45 which plays in a vertical slot 46 in each wall in accordance with the throw of the cranks on rotation of the inner shaft. In like manner the outer shaft 43 has similar cranks 47 fixedly secured thereto interiorly of the plates 41. These cranks are provided at their outer ends with lateral outwardly directed pins 48 which extend through the walls 40 in another pair of the clearance slots 46. The cranks 44 and 47 are oppositely directed and are spaced 180 degrees apart. See Figs. 1, 3, 4 and 5.

Figure 3:
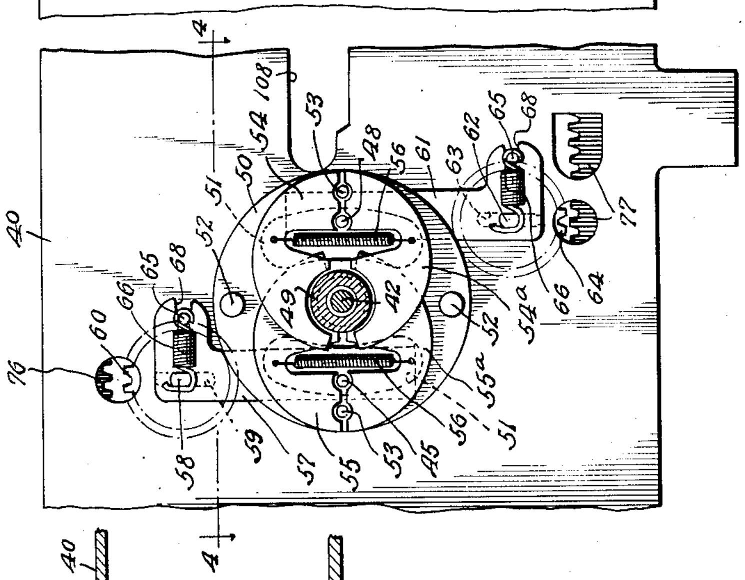
Fig. 3 is a fragmentary elevation, with detail added, of the structure shown in Fig. 2.
Figure 4:
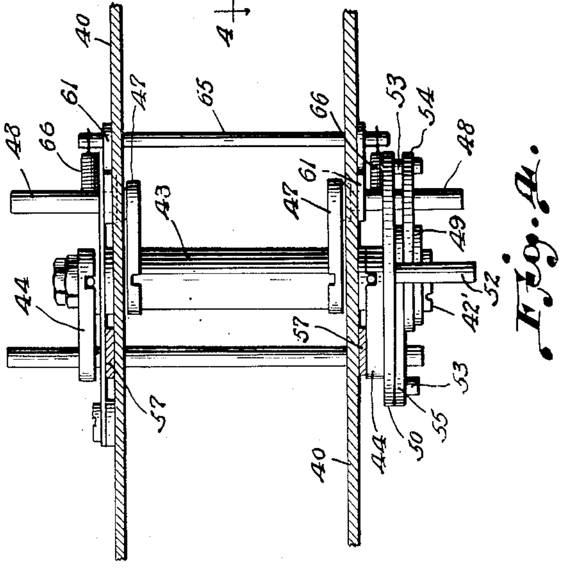
Fig. 4 is a sectional view substantially on the line 4—4 of Fig. 3.

Shaft 42 extends outwardly beyond the walls 40. One end of the inner shaft 42 journals an annular shouldered sleeve 49 spaced axially from the adjacent crank 44 and which is secured to an inner disc 50 and provides a bearing for portions of two smaller split discs. The sleeve is free to turn on the shaft between the crank 44 and a retaining nut 42′ in the end of the shaft. The large disc 50, best shown in Fig. 3, is formed with a pair of diametrically opposed arcuate slots 51 through which extend, respectively, the adjacent end of the rod 45 and the adjacent pin 48, in ample clearance. The disc 50 is further provided with a pair of outwardly directed lateral studs 52 in diametric opposition, and with a second pair of similar but shorter studs 53 diametrically opposed and spaced 90 degrees relative to the studs 52, and radially outward of the slots 51.

Each split disc, see Fig. 3, comprises two identical semicircular sections. The one at the right relative to Fig. 3 consists of sections 54 and 54*a*, and that at the left has sections 55 and 55*a*. The sections of the discs are in coplanar relation and are provided at their opposed edges with rounded bearing recesses adapted to seat over the shouldered sleeve 49 and over the disc studs 53, the rod 45, and pin 48. The sections are further formed with an aperture suitable to house a contractile spring 56 secured to the sections in a manner biasing their opposed edges into meeting engagement. The opposed edges are angled in diverging relation between the peripheral edge of each section and its large recess, so that when the split discs are assembled their sections are capable of a relative rocking movement. As shown in Fig. 3, the split discs are disposed in overlapped relation and eccentric with respect to the assembly of the shafts 42 and 43. Their springs 56 urge the opposed edges of the sections in clamping engagement over the sleeve 49, end of rod 45, pin 48, and studs 53.

The rod 45 extends through and pivotally supports the lower ends of a pair of inverted L-shaped links 57 that are vertically slidable on the outer faces of the walls 40. These links support between their upper ends a transverse register pinion shaft 58 which plays in and through a vertical guide slot 59 in each wall. A set of register pinions 60, one for each numerical order, is freely rotatable on the shaft 58 between the plates 41. In like manner, the pins 48 of the sleeve shaft cranks 47 extend through and pivotally support the upper ends of a pair of depending L-shaped links 61 that are vertically slidable on the outer faces of the walls 40. The depending links support between their lower ends a transverse register shaft 62 which plays in and through a vertical guide slot 63 in each wall. A second and similar set of register pinions 64 is freely rotatable on the shaft 62, each being in vertical coplanar alignment with its corresponding pinion in the upper set. When the register pinions are in neutral position they are latched against rotation by means of a bar 65 meshed with the pinion teeth under the pull of contractile spring 66. The latch bar for each set of pinions extends between the walls 40 and projects at each end through a triangular aperture 67 in the wall, with the end of the bar slidably supported in a horizontal slot 68 in the foot of the adjacent link 57 or 61. Reciprocation of the links correspondingly moves the latch bars, which then are cammed by the sloping sides of the apertures 67 and shifted laterally against the pull of the spring 66 to disengage the register pinions.

A driving connection, later described, between the disc 50 and a rocker actuated by the operating member OP effects an oscillation of the shaft assembly 42—43 to shift the register pinions into operative engagement with racks of the calculating actuator slides just before the slides start to move back from their forward limit positions following a printing operation, whereby the amount of the item is added or subtracted in the register in accordance with the setting of the machine controls for effecting the direction of oscillation.

Figures 6, 7, 8:
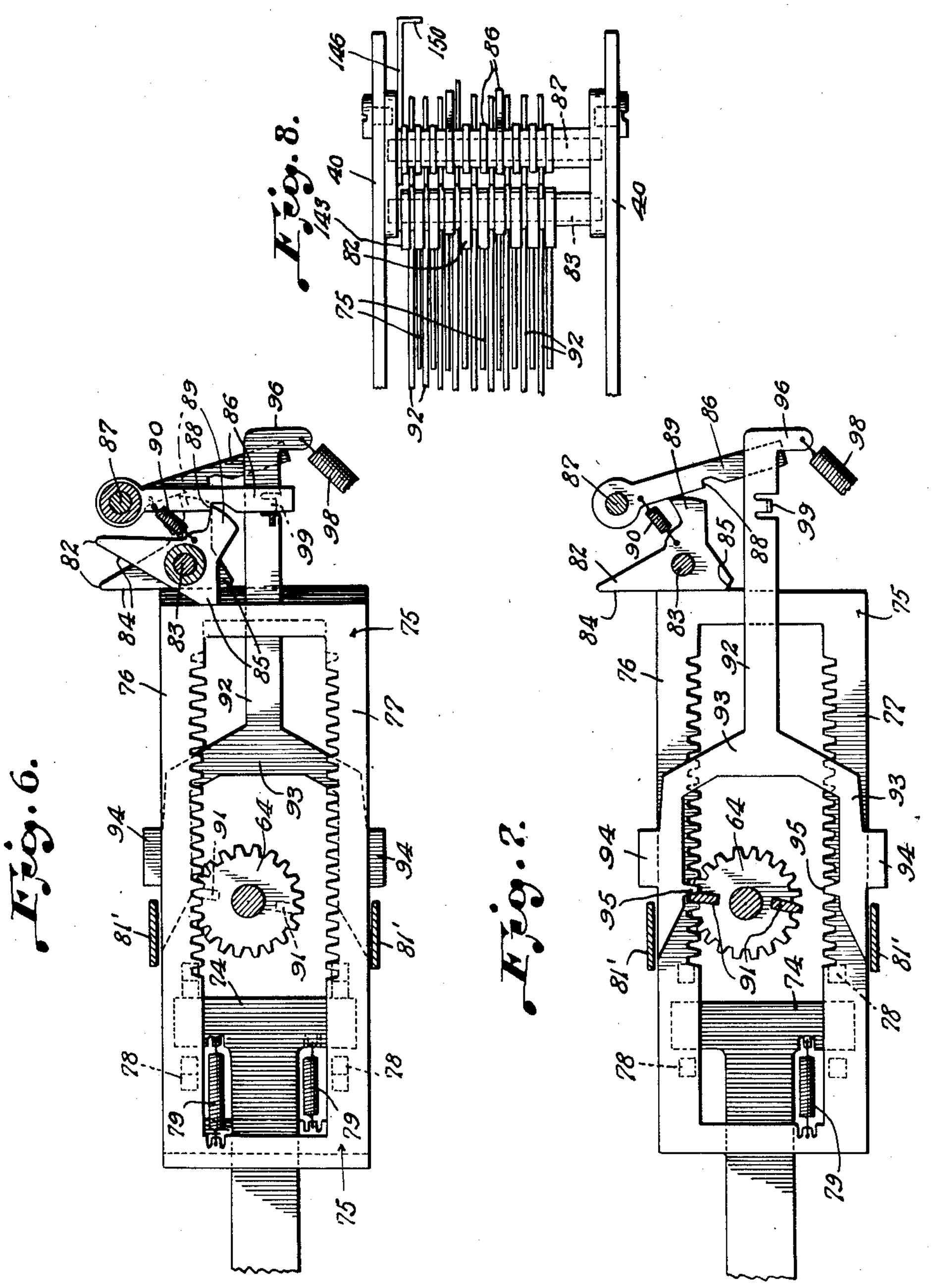
Fig. 6 is an elevation illustrating details of the racks and the rack rests as employed in connection with tens transfers.
Fig. 7 is an elevation similar to Fig. 6, with one of the racks and rack rests removed.
Fig. 8 is a fragmentary top plan view of the rack and rack rest transfer mechanism.

The register actuating slides 31 are arranged in parallel relation for horizontal reciprocation in a guide comb 70 mounted on transverse supports 71 in the calculating unit frame. Each slide is rearwardly bifurcated to provide an upper register stem 72 and a longer lower register stem 73 in parallel coplanar vertical alignment. Each stem terminates in a T-head 74 disposed at one side of a rectangular box rack 75 having a top rack bar 76 and a bottom rack bar 77 toothed to mesh with the adjacent register pinion that is disposed between the two. With reference to Fig. 7, it will be seen that the stem head plays between a pair of longitudinally spaced lugs 78 on the front end portion of both rack bars. These lugs are directed laterally from that side of the rack which faces the rack of the next higher denominational order. A contractile spring 79 connected between a flange of the T-head and the front end of the rack normally biases the rack to the position shown in Fig. 1, with the front lugs 78 abutting the flanges of the T-head. It has proved practical to employ a single spring, with the springs of alternate racks staggered, but if desired a pair may be used for each rack. The racks are supported and guided by comb plates 80 extending transversely between the frame sides 40 at the front end of the racks, and by comb plates 81 of greater width similarly mounted rearwardly of the plates 80 and spaced therefrom. The comb plates are provided with rearwardly directed vertically convergent fingers 80*a* and 81*a*, respectively, which engage the sides of the racks to maintain them in properly spaced and vertical position. When the racks are fully retracted, as shown in Fig. 6, their vertical rear ends abut individual rack rests 82, in which position the springs 79 are under tension urging the racks to further rearward movement.

The rack rests of both register sets, see Figs. 6, 7, and 8, comprise thin planar rockers pivoted freely on a fulcrum shaft 83 common thereto which extends transversely between supports secured on the calculating unit side walls 40. The rack engaging edge of each rocker has a relatively long straight edge face portion 84 and a short straight edge face portion 85 at an obtuse angle rearwardly from the portion 84. Both portions are tangential to the arc of swing of the rocker. Normally, with the racks at rest in rearmost position under conditions of no transfer in the register, the rockers are disposed with their short edges 85 engaged by the racks. The rockers of the respective register sets are relatively reversed, with the fulcrum shaft 83 in the upper register horizontally aligned with the bottom rack bars 77, and with the fulcrum shaft in the lower register horizontally aligned with the top rack bars 76. In each case the short edges 85 of the rockers are horizontally offset relative to the fulcrum point, so that pressure of the engaged racks under the rearward urge of the tensioned springs 79 constantly biases the rockers to pivot in a direction to bring their long edges 84 to rack holding position. The rests 82 normally are held against such pivotal movement by a latch lever 86 individual to each rocker directly in rear thereof. The latch levers in each register set have one end freely pivoted on a fulcrum shaft 87 common thereto and extending transversely between the supports which mount the rocker shaft. A recess in the forward edge of each lever provides a shoulder 88 that engages over a nose 89 on the associated rocker when the latch lever is disposed vertically in parallel relation to the rear end of the associated rack. The end of the nose 89 is rounded off to provide ample clearance in the latch lever recess, and the latch shoulder 88 is so located that when it is engaged over the nose of the rocker the nose is held in the same horizontally offset relation to the rocker fulcrum point as the short edge 85 of the rocker. Due to this arrangement, the pivotal bias of the rocker is transmitted through its nose portion as a vertical longitudinal thrust against the latch shoulder 88, so that the latch is held forcibly engaged also under the urge of the springs 79 when the rack contacts the rest. A relatively weak contractile spring 90 connected between the rocker and the latch lever near its fulcrum point maintains the lever in contact with the rounded edge of the rocker nose when the latch is disengaged and serves also to bias the nose of the rocker for movement out of a position in which it can engage the latch lever shoulder 88.

*Transfer mechanism*

In the present embodiment of the invention each register pinion has twenty teeth representing two series of digits 0–9. In both the upper and lower sets each pinion is provided on its side face adjacent the next higher order pinion with a pair of diametrically opposed lugs 91, each of which is a lateral enlargement of a tooth at the zero position. These lugs function in cooperation with interponents 92 in effecting a transfer or "carry" from each rack to that next in order. Each rack is paired with an interponent located alongside the rack face adjacent the next higher denominational order rack. The interponent body has a horizontally disposed shank bifurcated at its front end to provide parallel arms 93 contiguous to the top and bottom bars of the rack. These arms are supported and guided for horizontal reciprocation in the rear comb 81 in the same manner as the racks. Stop lugs 94 on the arms play in the slots of the comb and are engageable against a stop plate 81' in front of the slots to determine the forward limit position of the interponent. Each arm has an integral single tooth 95 adapted to coincide with a tooth of the adjacent rack bar and to be engaged by one of the lugs 91 of the register pinion of its paired rack to effect a bodily shift of the interponent rearwardly when the pinion is rotated additively beyond the ninth digit, thereby necessitating a transfer, and to stop the pinion at zero point when the interponent is in forward stop position and the pinion is reversely rotated.

As best shown in Figs. 6 and 7, a transfer is made by effecting a one digit further movement of the next higher order rack beyond the point at which the transferring rack comes to rest. The shank of each interponent 92 extends rearwardly in the median plane of its rack beyond the area of movement of the latch levers and is provided with a vertically directed terminal 96. The shanks are guided in and supported by comb elements 97 generally similar to the combs 80 and 81. A contractile spring 98 between each shank terminal 96 and a point on its guide comb urges the interponents forwardly to abut their stops 94 against the stop plates 81'. The rear end portion of each shank carries an ear 99 directed laterally toward and in front of the latch lever of the next higher order rack assembly, with the ear contacting the edge of the latch lever when the lever is in latch-engaged position and the interponent is at its forward limit position. When a lug 91 on the register pinion driven from a rack from which a transfer is to be made engages the transfer tooth 95 of its interponent, it cams the interponent bodily rearward the distance of at least one rack tooth. At the same instant the ear 99 on the interponent shank trips the engaged latch lever rearwardly to free the nose 89 on the rocker holding the next higher order rack, whereupon the rocker pivots as previously described to swing its short edge 85 rearwardly and permit its rack to shift rearwardly until arrested by the long edge 84, a distance of one rack tooth beyond that of its non-transferring position. Thus a transfer of one digit is added in the pinion of next higher order.

When the racks come to rest against the short edges of their rockers, each is under spring tension urging further rearward movement, which occurs simultaneously with pivotal swing of its rocker. When the pinions are conditioned for transfer and each rack begins its further one tooth rearward movement, its register pinion shifts its interponent to release the latch of the next higher order rocker to swing and thereby simultaneously to allow a further one tooth rearward movement of its own rack, whereupon the process is successively repeated in the ascending order racks. Each rack moves the additive step under the force of its own spring 79 and motivates the latch release for movement of the next order rack under the fresh force of its own spring bias. The racks are independently propelled by the force of individual springs of equal strength.

*Reset mechanism*

On computing operations of the machine when the operating member OP is cycled the register pinions are shifted to neutral disengaged position intermediate the rack bars at the beginning of the cycle and then resetting means is motivated to restore and relatch all rack rest rockers pivoted out of initial position in effecting transfers. The reset mechanism includes a fulcrum shaft 100 supported in and transversely between the side walls 40 of the calculating unit frame in both registers. The opposite ends of these shafts project outwardly through the walls 40. A vertically disposed lever 101 is pivoted intermediate its ends on each projecting end of the fulcrum shafts outwardly of the side walls. In conformity with the offset relation of the upper and lower registers, the levers 101 are correspondingly offset and are connected at their inner ends by a link 102 for movement in unison. Oscillation of the levers 101 is normally effected by means of a throw link 103 pivotally connected at its rear end to a cross bar 104 connected transversely between the outer end portions 105 of the levers 101 in the lower register. A second lever 106 is pivoted at its outer end on the fulcrum shaft 100 for oscillation alongside each lever 101. These levers 106 are inclined forwardly with respect to the levers 101, and each pair supports between its inner ends a transverse reset bar 107 which plays freely through clearance apertures 108 in the walls 40 forwardly of the rack rest rockers 82. A coiled contractile spring 109 is trained over a sheave 110 on the inner end of each lever 101 of the lower register and yieldingly connects the inner ends of the levers 106 and shafts 107 for movement in unison. When the levers 101 are rocked by pull of the link 103 as the operating member moves forwardly, the sheave 110 pulls the spring 109 rearwardly and correspondingly rocks the levers 106 to move the reset bars 107 against the outer front ends of the rockers 82 and return them to initial latched position.

The reset mechanism is adapted for operation independently of the operating member by means controlled from the total or subtotal key of the machine, so that upon actuation of the key the reset mechanism is operated before the start of the total taking cycle of the operating member, thereby eliminating the need of a blank stroke prior to total taking. This means forms no specific part of this invention and is, therefore, only partly shown herein. It comprises the subject matter of my copending application Serial No. 115,926, filed September 15, 1949, now Patent No. 2,649,250. Briefly described, it comprises a power lever PL (Fig. 2) biased to move forwardly by spring motor means M to advance the link 103 through pull on a tractor link T connected between the power lever and the link 103. The motor means M is actuated under the influence of a control element, not here shown, which is movable to condition the machine for total taking. When the reset is operated directly from the operating member OP, the link 103 is powered from the operating member by means of a drawbar D secured at its forward end to the operating member and having a closed end slot engaged over a pin on an element of the link 103.

Rack reset means is provided for operation in conjunction with the rocker reset mechanism. The rack reset in each register includes a third lever 111 also pivoted on the fulcrum shaft 100 alongside each lever 106 to oscillate in a vertical plane. The levers 111 mount between each pair a transverse reset bar 112 which plays freely through clearance apertures 113 in the walls 40 in rear of the racks. When the actuator levers 101 are rocked, the levers 111 are correspondingly pivoted through the pull of a contractile spring 114 connected between one end of each lever 111 and the cross bar 104 in the lower register set, and between one end of each lever 111 and the free end of an auxiliary link 115 in the upper register set. The other end of each link 115 is pivotally connected to the forward end of the link 102. By means of the linkage just described the rack reset bars 112 engage the rear ends of those racks moved additively beyond the others and restore them to initial alignment with the others. Further forward propulsion of the racks is prevented by engagement of the bars 112 against the forward ends of their clearance apertures 113, which ends are vertically aligned with the short edges 85 of the rests 82 when in initial non-transfer position.

Resetting of the racks is expedited by the camming action of the rockers 82 against the rear ends of the racks as the rockers are swung by their own reset bars 107. Furthermore, when the rockers begin resetting movement, their nose portions 89 move away from the latch levers which already are spring biased to move into engaged position; so that when the rockers come to rest the latch levers continue to move until their shoulders 88 are fully latched over the noses of the rockers.

*Register shift*

Figure 2:
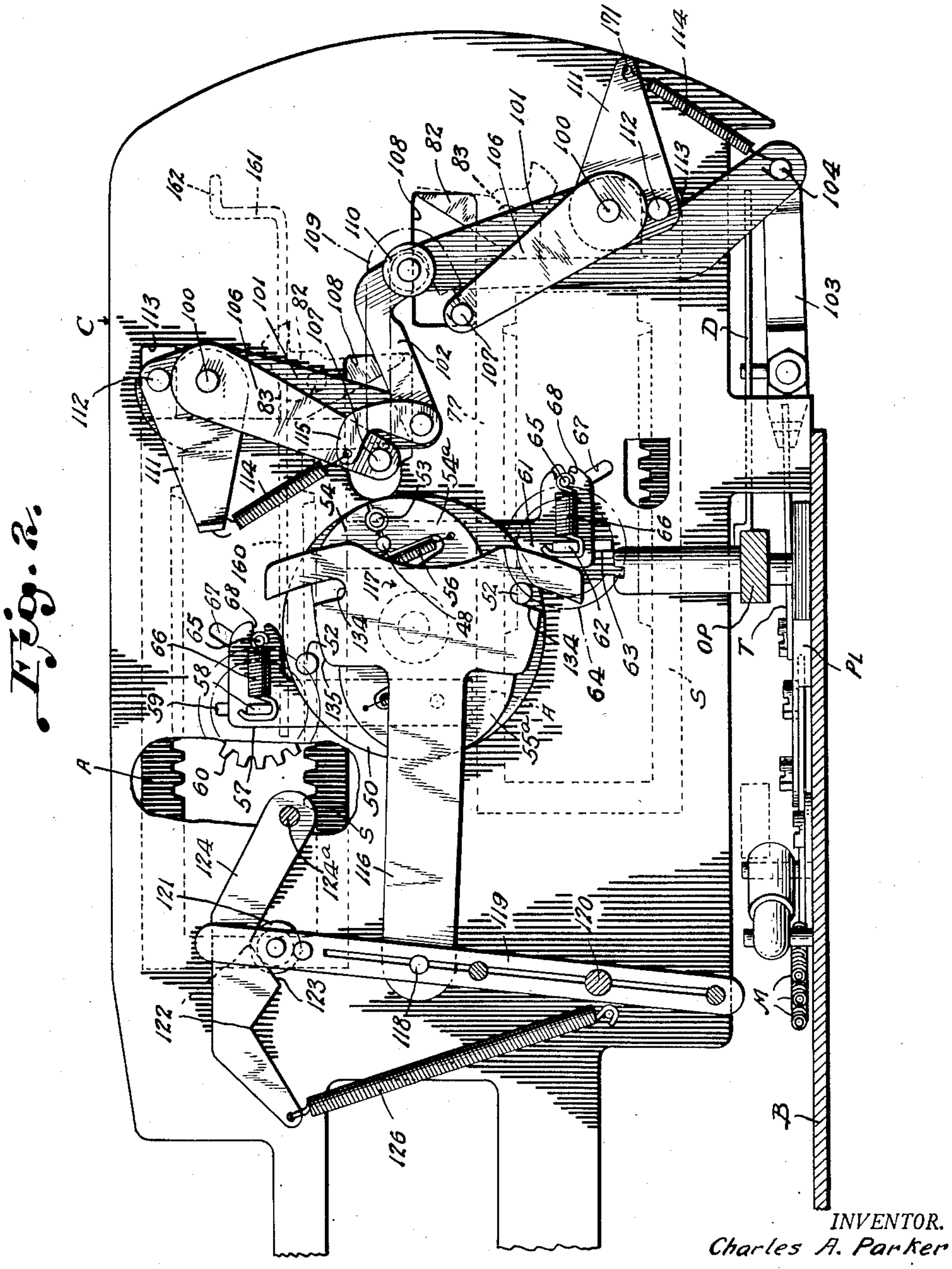
Fig. 2 is an elevation illustrating details of the register shifting mechanism and the reset mechanism.

In this embodiment of the invention the addition side of the racks is in the top bars and the subtraction side of the racks is in the bottom bars of the upper and lower racks; so that when the register pinions are shifted into rack engagement, as in Figs. 1 and 2, the lower register is employed for addition and the upper register for subtraction. When the slides 31 move forward for indexing and printing, both the upper and the lower sets of register pinions are in neutral disengaged position. At the initiation of rearward movement of the operating member OP in the second half of its cycle, a connection from the operating member operates to rock the cranks 47, shaft 43, and the pins 48 to lift the links 61 and thereby carry the set of lower register pinions 64 into mesh with the top bars of their racks. At the same time, the links 57 are lowered to carry the set of upper register pinions 60 down into mesh with the bottom bars of their racks. The driving connection from the operating member OP includes a horizontally disposed lever 116 having a rearwardly directed arcuate T-head 117 located alongside and outwardly of the assembly of split discs and the larger disc 50. This lever 116 is of thin planar structure and is pivoted at its forward end to oscillate in a vertical plane on a fulcrum member 118 carried on a vertical rocker post 119. The rocker post is pivoted between its ends on a fulcrum 120 carried by a support element secured on the base of the machine. At its upper end the post mounts a roller 121 that is engageable in valleys 122 at the sides of a ridge 123 upon the bottom edge of a detent lever 124 which is pivoted at one end as at 124*a* to the support element secured to the base of the machine. The detent is biased downwardly in engagement with the roller 121 by a contractile spring 126 connected between the free end of the detent and a point of attachment on the support, whereby the post is held yieldingly in either of two positions determined by the valleys 122.

Figure 5:
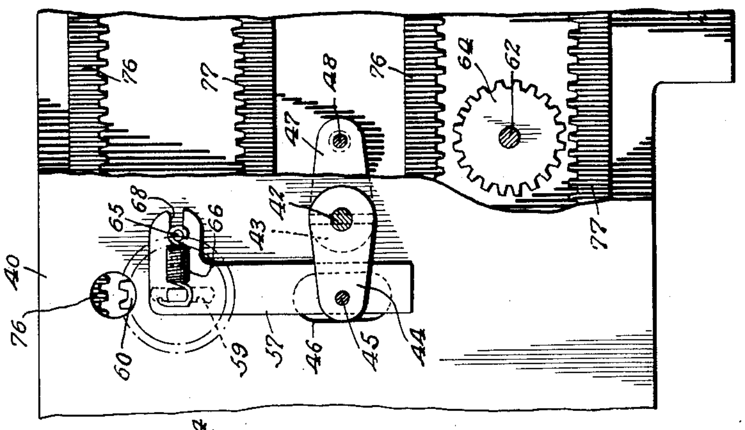
Fig. 5 is an elevation, with parts removed, of detail shown in Fig. 3.

In the position of the parts as shown in Figs. 3 and 5 the register pinions are in neutral disengaged position. When the operating member OP moves rearwardly, its connection, not shown, of any suitable type, with the rocker post 119 rocks the post rearwardly, as shown in Fig. 2, and correspondingly shifts the lever 116. The head 117 seats on the lower of the pair of studs 52 on the large disc 50, with the stud housed at the inner end of an arcuate keeper slot 134 in the lower arm of the head 117. The upper stud 52 is adapted to play in a similar slot 134 in the upper arm of the head when the lever 116 is rocked upwardly. In the normal position of the lever, the upper disc stud is free of its keeper slot and is in position to ride over a lateral reduction 135 of the head when the disc is rotated counterclockwise, as shown in Fig. 2. Rearward shift of the lever 116 drives the lower stud 52, rocking the disc 50 in a counterclockwise direction, as shown in Fig. 2. This rocking movement correspondingly elevates the rear stud 53 of the disc 50 and simultaneously correspondingly lowers the forward stud 53 of the disc. As the rear stud 53 moves up it lifts the split disc section 54 and this section in turn, acting through its spring 56, pulls up the lower section 54*a* and correspondingly elevates the pins 48 so that the links 61 are lifted to shift the lower register pinions into engagement with the top bars of their racks. In like manner, but in reverse movement, the forward stud 53 in moving down depresses the split disc section 55*a* and this in turn, acting through its spring 56, pulls down the upper section 55 and correspondingly depresses the rod 45 to lower the links 57 whereby the upper register pinions 60 are carried down into mesh with the bottom bars of their racks. When the operating member OP is again cycled, its forward movement is transmitted through the driving connection to rock the post 119 forwardly and correspondingly to shift the lever 116 forwardly. In so moving, the lever, acting through the head 117, drives the lower stud 52 in a clockwise direction. This movement of the stud correspondingly rocks the disc 50 so that its rearward stud 53 is carried down to depress the lower split disc section 54*a*. This section, acting through its spring 56, correspondingly pulls down the upper section 54 which, in turn, carries down the pin 48 and thereby lowers the links 61 to move the lower register pinions out of engagement with their racks and back to neutral position. In like manner, but in reverse movement, clockwise rotation of the disc 50 elevates its forward stud 53 to raise the split disc section 55 and exert a pull on the spring 56. This pull elevates the lower disc section 55*a* and correspondingly elevates the rod 45 to lift the links 57 and carry the set of upper register pinions out of engagement with the lower bars of their racks and into neutral position. In the operation as just described, the pinions would have been shifted during the cycle of operation so that a computed amount would be added in the lower register and simultaneously subtracted in the upper register. This is the operation for a mathematically added amount.

Figure 12:
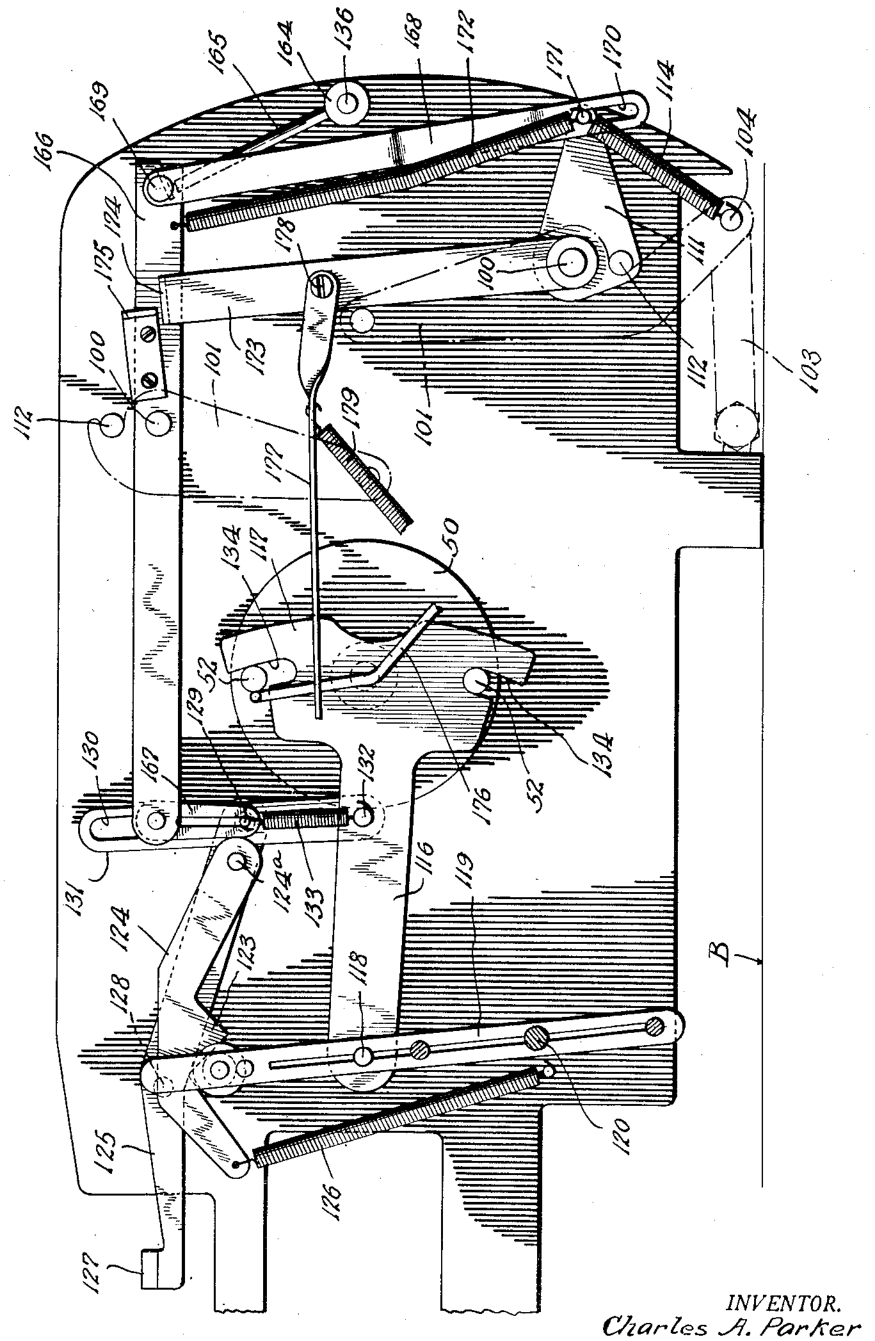
Fig. 12 is an elevation at the right rear end portion of the machine, illustrating details of the register shifting mechanism and control elements of the register selecting mechanism.

When the calculating unit is to be conditioned for a mathematically subtract computation, a control lever 125, Fig. 12, is manipulated. This lever is adapted for manual as well as automatic actuation from its forward end terminal 127. The lever is pivoted intermediate its ends as at 128 to a support and is adapted to rock in a vertical plane. The rear end of the lever carries a lateral stud 129 which rides freely in a vertical slot 130 of a guide link 131 that is disposed above the lever 116 with the lower end of the link pivotally engaged with a stud 132 on the shank of the lever. A contractile spring 133 between the studs 129 and 132 provides an operating connection between the two levers. When the control lever 125 is actuated to depress its terminal 127, the rear end of the lever rises and, through the spring connector 133, correspondingly rocks the lever 116 upwardly, when it is brought to its forward position by rocker post 119 rocked by the operating member OP, to lift the head 117 so that its lower arm keeper slot rises clear of the lower stud 52 of the disc 50. At the same time the keeper slot 134 in the upper arm of the head fully engages over the upper stud 52. The parts are thus conditioned so that when the operating member OP moves rearwardly its driving connection with the lever 116 imparts a clockwise movement to the disc 50. This clockwise movement of the disc 50, acting in the manner already described through the split discs, simultaneously shifts the register pinions to move the pinions of the upper register into engagement with the top bars of their racks and at the same time to move the pinions of the lower register downwardly into engagement with the bottom bars of their racks. In this position of the parts, movement of the racks travelling rearwardly rotates the register pinions oppositely to the direction of their rotation when engaged for mathematical addition, so that a subtract operation is effected in the lower register, and add operation in the upper register. In these operations the entire tens transfer operates as a "borrow" action in subtract operation of the registers in the same manner as a "carry" action in the operation of addition in the registers.

In taking a subtotal of an amount it is necessary to employ one register for an interval of operation while action of the other is temporarily suspended. In such case, means, later described, is employed to hold a set of pinions in one register from shifting while the other is shifting. This action is made possible by the flexibility of the coupling comprising the assembly of the large disc 50 and the smaller split discs. An important concept to be grasped at this time is the extremely wide range of possible combinations of register shifting permitted by the high flexibility of the coupling comprising the disc assembly. This is due to the springs 56 in conjunction with the split discs and provides a coupling having any desired yielding characteristic whereby various combinations of register shifting can be effected. The flexibility of the disc assembly would permit both sets of register pinions to be engaged simultaneously in both lower bars of the racks or in both upper bars of the racks.

When the slides 31 move forward under the pull of their spring connectors 36 moving with the operating member OP in the first half of its cycle, their T-heads 74 engage the forward rack lugs 78 and the racks are correspondingly advanced to the point at which they are stopped by any control instrumentality which determines the extent of their advance and, consequently, the printing position of their paired type bars. At the conclusion of a printing operation the operating member starts back through the second half of its cycle. Before the racks begin their back stroke the connection 116 given movement by the operating member effects a shift of those register pinions which are free to shift and the pinions are meshed with their respective racks or disengaged therefrom or remain meshed.

*Automatic selection mechanism*

Figure 9:
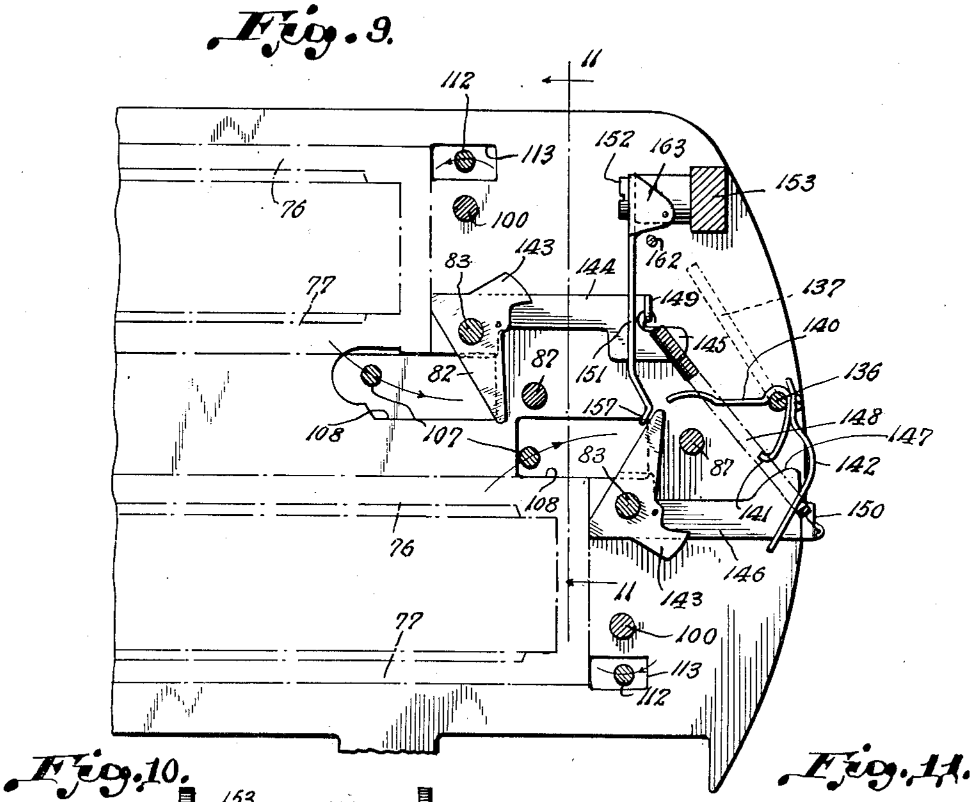
Fig. 9 is an elevation, partly in section, illustrating details of the selector means in connection with transfer elements actuated by the highest numerical order pinions in each register.
Figure 10:
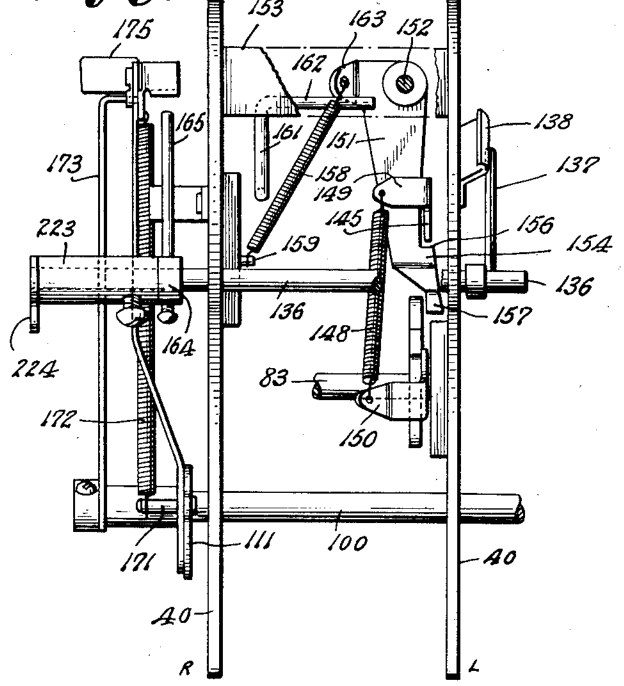
Fig. 10 is a rear elevation illustrating details of the structure shown in Fig. 9.
Figure 11:
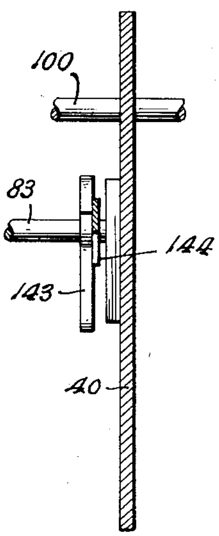
Fig. 11 is a vertical section substantially on the line 11—11 of Fig. 9.
Figures 13, 16:
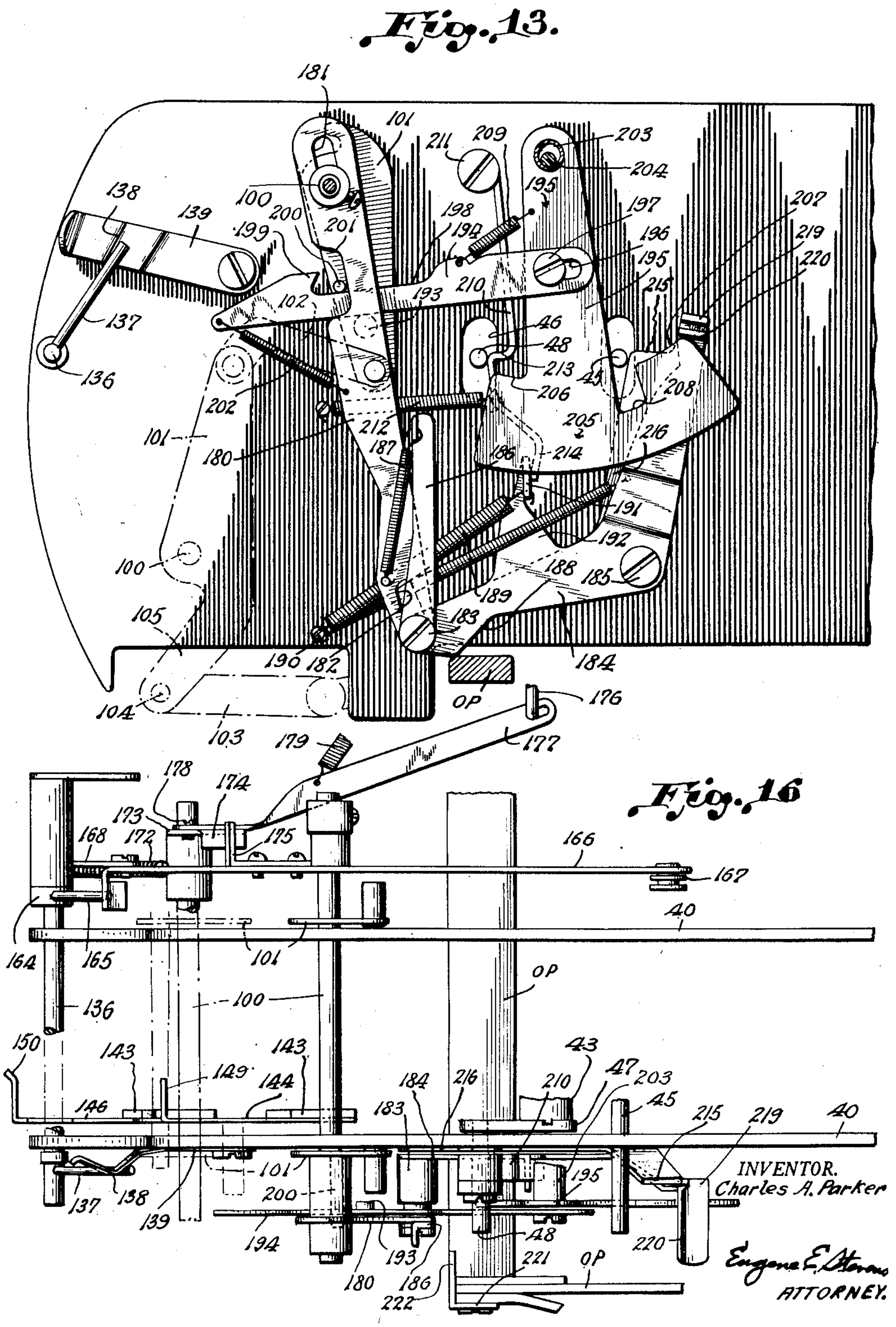
Fig. 13 is an elevation at the left rear end of the machine, illustrating details of the register shift control means actuated for subtotaling operation with the parts positioned prior to a computing operation of the machine.
Fig. 16 is a top plan view of the mechanism.

Whenever a total or subtotal is taken, the amount is drawn from that register which has the final positive accumulation prior to the total taking cycle of the operating member. Selection of the register from which the total is to be taken is made automatically by means governed by the condition of the pinions, so that the register in which the pinions have the final positive accumulation is the one which is selected. With particular reference to Figs. 9 and 10, it will be seen that the rear ends of the calculating unit side walls 40 journal a transverse shaft 136 which extends laterally outwardly of the plates at each end. As shown in Fig. 13, the end of the shaft which extends beyond the left side wall 40 has rigidly secured thereto an upwardly and forwardly inclined selector pin 137 which overrides a ridge 138 in a spring detent member 139 that is attached as at 140 to the side wall. The detent member is a thin leaf spring tensioned laterally outward with respect to the side wall so that when the shaft 136 is rocked the pin 137 overrides the detent ridge and is held in the position which it assumes at either side of the detent ridge, so that the pin and shaft are held yieldingly against casual rocking. On the inner side of the left hand wall 40 the shaft 136 has rigidly secured thereto a forwardly directed finger 140 and a pair of downwardly directed fingers 141 and 142. These fingers extend into the zone of operation of actuator arms that are fixedly secured to rockers 143 in the two registers. These rockers 143 are identical to the rack rest rockers 82 and are similarly mounted, similarly operated, and similarly reset by the bars 107. In the case of these two rockers, their operation is derived from the interponent of the highest denominational order pinion in that the interponent trips the latch, not shown, of the rocker. The upper register rocker 143 has its actuator arm 144 extended rearwardly substantially in the plane of the rocker and is provided with a downwardly and rearwardly offset terminal portion 145 that is adapted to engage the forward end of the finger 140 when the rocker moves in a clockwise direction with respect to Fig. 9. The actuator arm 146 of the rocker 143 in the lower register extends rearwardly substantially in the plane of the rocker and is provided with a nose 147 that is adapted to engage the finger 141 when the rocker moves in a counterclockwise direction with respect to Fig. 9. The two rockers 143 normally occupy the positions indicated in Fig. 9. In this figure the racks of the highest denominational order are indicated in dot dash lines merely to show the relative position of the parts. As previously explained, these racks do not themselves engage the rockers. The means for moving the rockers in this instance comprises a contractile biasing spring 148 connected between a lug 149 on the upper actuator arm 144 and a lug 150 on the lower actuator arm 146. Tension of this spring normally tends to draw the two actuator arms into converging relation when the rockers 143 are released from engagement with their latches, not shown, which are identical to the latches 86. When either rocker is released the bias of the spring 148 effects its movement in the manner described. When the condition of the pinions in the lower register effects a transfer which has operated its highest denominational order pinion to move its interponent, it thereby releases the latch of the lower rocker 143 so that it tends to swing counterclockwise and carry its nose against the finger 141. At the same time the ear 150 engages behind the finger 142 so that the combined action of the nose 147 and the ear 150 acts upon the fingers 141 and 142 to rock the shaft 136 clockwise with respect to Fig. 9 so that the selector pin 137 moves from its Fig. 13 position to the rear side of the detent ridge 138 and is held by the detent in that position. This movement of the selector pin effects the selection for total or subtotal taking of that register which holds the final positive accumulation prior to a total taking cycle of the operating member. With respect to the actuator arm 146, the fingers 141 and 142 operate jointly to rock the shaft 136. The ear 150 on the actuator arm effects a necessary initial movement of the actuator arm to the point at which the nose 137 engages the finger 141, whereupon further movement of the finger 141 on the shaft 136 is taken over by the nose of the actuator arm.

When the conditions of the pinions in the upper register effect a transfer which actuates the highest denominational order interponent, it thereby trips the latch of the upper rocker 143 whereupon it swings clockwise under the bias of the spring 148 to carry the terminal portion 145 of its actuator arm down to depress the finger 140 and thereby to rock the shaft 136 in a counterclockwise direction with respect to Fig. 9. This movement carries the selector pin 137 forward to the opposite side of the detent ridge 138 and it is held by the detent in that position until it is again moved by actuation from the lower register rocker.

There are conditions under which it is not feasible to permit operation of either rocker 143 when it normally would be called upon to operate by the conditions existing in its associated register. The means here disclosed is shown as it functions with the calculating mechanism of this type in which the addition and subtraction in each register is actuated by a rack moving to perform both operations and in which the transfer mechanism serves both for "carry" and for "borrow" in tens transfer action of the register pinions through their racks, and hence a transfer from a pinion actuates the same mechanism when that pinion is in subtraction operation as when it is in addition operation.

In this disclosure of the means it is desirable that the mechanism operable from the pinion of highest order functions to move the selector pin 137 forward when the pinion is turned from its zero to nine position in a subtraction operation. It is not desirable that the pinion cause movement of the selector pin when the pinion is turned from its nine to zero position in an addition operation, although in each instance the same mechanism tends to operate.

This invention incorporates double acting latch means that is normally engaged to hold one of the actuator arms 144 and 146 against operation while the other is permitted to operate. Disengaging movement of the latch means from the held actuator arm effects a latch engagement with the other actuator arm, so that the one previously held is free to operate while the other is prevented from operation by its engagement with the latch. This latch means, best shown in Fig. 10, comprises a bell crank lever 151 that is suspended on a fulcrum 152 mounted on a support 153 supported between the frame walls 40. The lower long arm of the latch lever has a laterally offset terminal 154 providing a shoulder 156 adapted to engage beneath the terminal 145 of the actuator arm 144 of the upper register rocker, as shown in Fig. 10. The terminal 154 is further provided with a tip 157 that is adapted to be swung into the path of movement of the lower rocker 143 when the latch lever is swung laterally to disengage the upper actuator arm. When the upper actuator arm is freed, the tip 157 of the latch lever is swung into obstructing position relative to the lower rocker 143 so that the rocker cannot be moved. The latch lever normally is biased to the Fig. 10 position in which the actuator arm of the upper register rocker is held against operation by means of a contractile biasing spring 158 connected to a lug on the short arm of the latch lever and to a point of attachment 159 on an element of the right hand side wall 40.

The means for swinging the latch lever 151 against the bias of its spring to release the upper actuator arm 144 and hold the lower actuator arm 146 is governed by shifting movement of the pinions in the upper register. Whenever the set of pinions 60 in the upper register is moved down to engage the subtract side of the racks, the shaft 58 on which the pinions are mounted, see Fig. 2, contacts and depresses the forward end of a rod 160 which extends longitudinally rearward and which is fulcrumed on the shaft 83 for oscillation in a vertical plane. At its rear end the rod 160 has an upwardly directed portion 161 provided with a laterally directed terminal portion 162 that underrides the ear 163 on the short arm of the bell crank latch lever 151. As the pinions of the upper register move down into subtract position, the terminal portion 162 is elevated to cam the ear 163 upwardly and thereby to swing the latch lever against the bias of its spring and out of engagement with the upper actuator arm. As previously explained, this movement correspondingly effects blocking of the rocker controlling the lower actuator arm 146. It is evident, therefore, that whenever the upper register is conditioned for subtracting computation, the actuator arm 146 of the lower register rocker 143 cannot be operated to rock the selector shaft 136, so that the shaft then is under the sole control of the actuator arm 144 of the upper register for operation in the event that transfer conditions in the upper register will effect operation of the upper rocker 143.

*Subtotaling mechanism*

The end of the selector shaft which extends beyond the right hand frame wall 40 mounts a collar 164 fixedly secured thereto. The collar has fixedly secured thereto a blocking pin 165 directed at an angle of inclination corresponding to that of the selector pin 137 at the opposite end of the selector shaft. The blocking pin 165 rocks with the shaft 136 to dispose its upper end in either of two positions determined by the position of the pin 137 as held by the detent 139. Whenever the registers are conditioned by positive mathematical accumulation, the lower register will contain a true total of the positive accumulation in its pinions and the upper register will contain a complemental amount in its pinions. Since mathematically added items were added in the pinions of the lower register and subtracted in the pinions of the upper register and mathematically subtracted items were subtracted in the lower register pinions and added in the upper register pinions and the accumulation represented here is the result of the difference between the added items and the subtracted items in which the sum total of the added items exceeded the sum total of the subtracted items, the lower register will contain the true total. The upper register having accumulated in reverse to the lower register will have controlled the final position of the selector pin 137 actuated by the pinion of highest order, while in its subtract operation when turning from its zero to nine position, and the blocking pin 165 will be located as in Fig. 12. The blocking pin is inclined forwardly so that its upper end is engaged beneath the rear end of a lever 166 that extends horizontally forward and which is pivoted intermediate its ends on a fulcrum provided by the shaft 100 which constitutes an element of the reset mechanism for the upper register. The forward end of the lever 166 carries a pivotally suspended slotted link 167 engaged with the stud 129 to which is attached the upper end of the lifter spring 133. Whenever the lever 166 is oscillated to lower its rear end, the upward movement of its forward end is transmitted through the link 167 and through the stud 129 to shift the lever 116 upwardly, whereupon the upper stud 52 of the control disc 50 is engaged by the upper keeper slot 134 of the head 117 and the lower stud 52 is cleared, so that the mechanism is conditioned for shifting the pinions in a manner to effect reverse shifting of the pinions. The lever 166 normally is held in its Fig. 12 position by an elevator link 168 that is pivotally connected at its upper end as at 169 to the rear end of the lever 166, and which is provided at its lower end with a slot 170. When the reset mechanism is in normal condition prior to an operation thereof, a stud 171 on the rear end of the lower reset lever 111 engages the upper end of the slot 170 and holds the elevator link in raised position. A contractile spring 172 connected between the stud 171 and a point of attachment on the rear end of the lever 166 normally biases the rear end of the lever 166 to move downwardly. When the reset mechanism is in normal position this downward urge of the biasing spring 172 is resisted by the blocking action of the stud 171 which prevents downward movement of the elevator lever 168. When the reset mechanism is operated, clockwise movement of the lever 111 carries the stud 171 down so that the elevator lever 168 is free to move down to allow the bias of spring 172 to take effect, whereupon the rear end of the lever 166 is moved down provided no other blocking means prevents such movement.

During normal computing operation of the registers, depression of the rear end of lever 166 is blocked by a stop lever 173 which is pivoted at its lower end on the shaft 100 of the lower reset mechanism and which is provided at its upper end with a laterally directed terminal 174 that normally underlies a lug 175 mounted to extend laterally from the shank of the lever 166, as shown in Fig. 12. A control element 176, only part of which is here shown, is movable to the right with respect to Fig. 12 in the course of operation of mechanism, not forming a part of this invention, which actuates the spring operated reset mechanism independently of the operating member when either the total or subtotal key of the machine is actuated. In moving as indicated, this element 176 carries rearwardly with it a link 177. The link is connected at its forward end with the element 176 and has a pivotal connection 178 at its rear end with the blocking lever 173. A contractile biasing spring 179 connected between a point of attachment on the link 177 and to a fixed element, not shown, of the machine frame normally biases the link forwardly to hold the blocking lever disposed beneath the lug 175 of the lever 166. When the control element 176 is shifted rearwardly, the blocking lever 173 is correspondingly moved out of its blocking position so that the rear end of the lever 166 is free to move downwardly as the reset mechanism operates, provided the blocking pin 165 has been shifted to clear the rear end of the lever 166. Should the blocking pin be in its holding position as indicated in Fig. 12, clearance of the blocking lever 173 will have no effect on the lever 166, and the reset mechanism operates with the stud 171 moving in the slot 170 of the elevator link 168.

Figure 14:
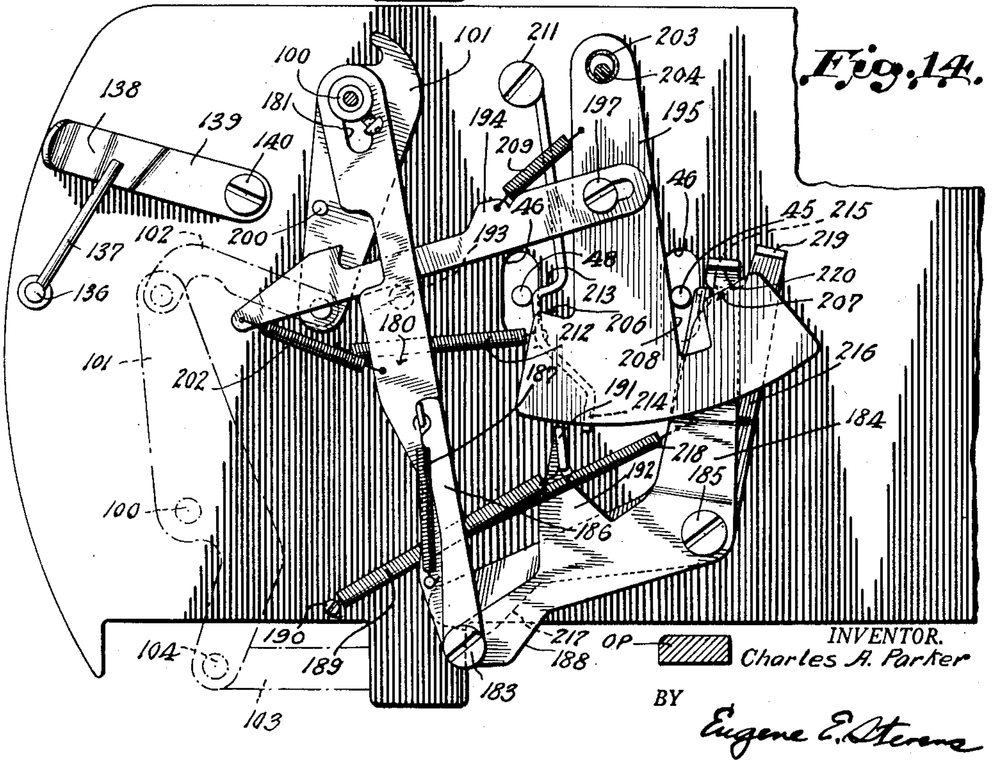
Fig. 14 is a view similar to Fig. 13 with the parts illustrated in position occupied in a normal computing operation during the first half cycle.

Outwardly of the left hand side plate 40 of the calculating unit frame there is disposed a vertical lever 180 which at its upper end is provided with a slot 181 slidably engaged over the shaft 100 of the upper register reset mechanism, and which at its lower end is provided with a similar slot 182 that is slidably engaged over a stud 183 carried by the rear end of a bell crank lever 184. The lever 180 has both slidable and pivotal connection, therefore, both with respect to the upper shaft 100 and with respect to the stud 183. The bell crank lever 184 is fulcrumed on a stud 185 carried by the adjacent wall 40 for oscillation in a horizontal plane. The stud 183 is fixed with respect to the bell crank lever 184 and has rigidly secured thereto an upstanding post 186 having attached to its upper end a depending contractile spring 187 that is connected at its lower end to the shank of the lever 180 so that the lever 180 normally is biased upwardly to engage the bottom of its slot 182 upwardly against the stud 183. The rear end portion of the bell crank lever 184 is inclined downwardly and carries a cam 188 that normally seats on top of the operating member OP when the operating member is in its rearmost limit position. When the operating member moves forward the bell crank lever is rocked by the bias of contractile spring 189 that is connected between a point of attachment 190 on the adjacent wall 40 rearwardly of the operating member and a point of attachment to a laterally directed ear 191 at the top of an upwardly directed extension 192 of the lower arm of the bell crank lever 184. As the operating member moves forwardly the urge of the spring 189 pulls the lower arm of the bell crank lever downwardly and this motion is transmitted through the stud 183 to pull the lever 180 downwardly until its travel is arrested by engagement of the upper end of its upper slot 181 over the shaft 100, as shown in Fig. 14.

A lateral stud 193 on the lever 180 normally underlies and contacts the lower edge of a hook link 194 which extends horizontally between the lever 180 and a blocking plate 195. The rear end portion of the link 194 has a closed end slot 196 that plays over a stud 197 on the blocking plate to provide pivotal and slidable connection. The upper edge of the link 194 has a longitudinal recess portion 198 that terminates at its rear end in a hook 199 that is adapted to engage over a lateral pin 200 carried by the lever 101 of the reset mechanism for the upper register. The rear edge of the lever 180 also is provided with a longitudinal recessed portion 201 which provides a clearance for the pin 200. When the operating member starts forward, the bell crank lever 184 is immediately rocked to lower its cam 188, whereupon the link 180 is drawn down to lower its stud 193 so that the link 194 correspondingly moves down to the position shown in Fig. 14 under the influence of a contractile spring 202 connected between the rear end of the link and the shank of the lever 180. Thus, the hook 199 is lowered so that it clears the pin 200 before the reset mechanism operates. As the reset mechanism operates, under these conditions, rearward shifting of the pin 200 will have no effect on the link 194, and the blocking plate 195 remains in its Fig. 14 position. The blocking plate is pivoted at its upper end on a bearing 203 mounted eccentrically on a supporting stud 204 that is secured to the adjacent side wall. The plate is thus pivotally suspended for oscillation in a vertical plane. The lower end of the blocking plate has a substantially T-shaped head 205 which provides at the rear edge of the plate a shoulder 206 that is adapted to be engaged beneath the pin 48 of the lower register shifting means, previously described, when the blocking plate is swung rearwardly to the position shown in Fig. 15. The pin 48 is thus blocked against downward movement, so that the pinions of the lower register are incapable of movement to the subtract side of their racks although they are free to move upwardly for mesh with the add side of their racks. The forward arm of the T-head 205 provides a shoulder 207 that is adapted to engage beneath the rod 45 of the upper register pinion shifting mechanism to hold the rod against downward movement when the blocking plate is shifted rearwardly, so that the upper set of register pinions are prevented from moving down into mesh with the subtract side of their racks although they are free to move upwardly into mesh with the add side. In the normal position of the blocking plate 195, as in Fig. 14, the shoulders 206 and 207 are clear of the pin 48 and the rod 45. The rear edge of the head 205 is disposed forwardly of the pin 48 when the blocking plate is in cleared position so that the pin 48 is free to move downwardly. In order to accommodate downward movement of the rod 45 in the cleared position of the blocking plate, the head 205 is provided with a clearance slot 208 which permits free downward movement of the rod.

Figure 15:
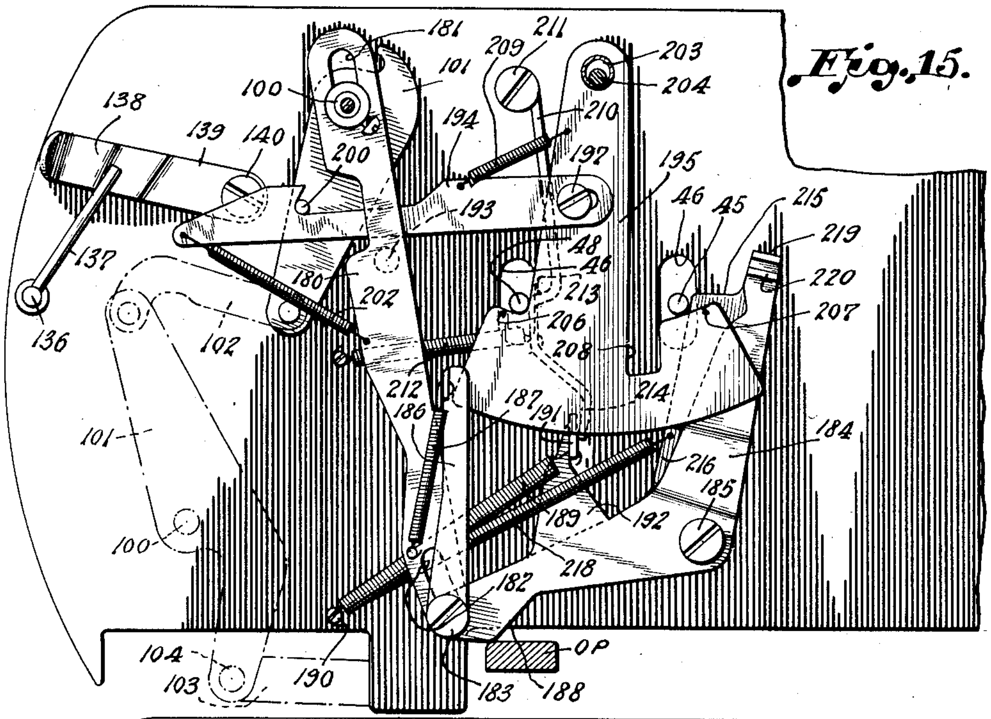
Fig. 15 is a similar elevation illustrating the position of the parts with the reset mechanism tripped prior to a subtotaling cycle of the operating member.

In order to follow the sequence of operations it must be remembered that the machine in which this invention is incorporated has mechanism by which the reset is spring operated under the influence of the total or subtotal key independently of the operating member and before the operating member starts to move in its total taking cycle. In consequence of this arrangement, while the operating member is at rest prior to the start of its total taking cycle, the cam 188 of the bell crank lever 184 is elevated by virtue of its seated engagement on top of the operating member. In this position the lever 180 is shifted upwardly so that its stud 193 lifts the link 194 into a position in which the hook 199 is adapted to engage the pin 200 on the reset lever 101. As the reset mechanism operates, under these conditions, the lever 101 in the upper reset mechanism rocks to the position shown in Fig. 15 so that the pin 200 engages the hook 199 to pull the link 194 correspondingly rearward. This rearward movement of the link 194 is transmitted through a connector spring 209 to the blocking plate 195. The spring 209 is connected between a point of attachment on the link and a point of attachment on the blocking plate. By virtue of this arrangement the blocking plate is swung to its blocking position, as shown in Fig. 15, by operation of the reset mechanism and both sets of register pinions are held against movement downwardly to the subtract side of their racks although both are free to move upwardly for engagement with the add side of the racks during the total taking cycle of the operating member.

It must also be remembered that in the operation of the machine in which this invention is incorporated the register pinions are shifted to neutral position by means influenced from the total or subtotal key just before the reset mechanism starts to operate, so that the rod 45 and pin 48 of the register shifting mechanism are in position to be blocked against downward movement when the blocking plate 195 is swung rearwardly under the actuation imparted by operation of the reset mechanism. It must also be remembered that the machine is provided with mechanism for returning the register pinions into mesh with their racks as the operating member moves forward in the first half of its total taking cycle. Due to the fact that the register pinions are blocked against shifting downwardly to the subtract side of their racks, and also due to the fact that they are urged for shifting simultaneously in opposite directions, only one of the sets of pinions will be shifted when the register shift mechanism operates. Either set of pinions which is shifted upward is free to move to the add side of the racks, so that the total always is taken from the add side of the racks.

It must also be remembered that a selection of the register from which the total is to be taken has already automatically been effected by the selecting mechanism previously described, so that the total is always taken from that register which has a final positive accumulation before the total taking cycle of the operating member. When the condition of the pinions in the registers indicates a final positive accumulation in the lower register, the shift control mechanism is in the position shown in Fig. 2. As previously described, when the rocker post 119 is shifted rearwardly it acts through the lever 116 to impart counterclockwise rotation to the disc 50 so that its lower stud 52 which is engaged in the lower keeper slot 134 drives the disc 50 counterclockwise to elevate the pinions of the lower register into mesh with the add side of their racks. Simultaneously with elevation of the lower register pinions, the pinions of the upper register are urged downwardly but they are prevented from such movement by the blocking action of the plate 195.

When the condition of the register pinions is such that the final positive accumulation occurs in the upper register, the blocking pin 165 is shifted to clear the rear end of the lever 166 so that it is free to be lowered when the blocking lever 173 is moved rearwardly to clear the lug 175. As previously described, the mechanism influenced by actuation of the subtotal key shifts the link 177 rearwardly to move the blocking lever 173 out of its holding position so that the bias of the spring 172 acts immediately as the reset mechanism operates to lower the rear end of the lever 166 and correspondingly to elevate its forward end. Elevation of the forward end of the lever 166, acting through the link 167 and the stud 129, pulls the lever 116 upwardly to place the upper stud 52 in driving engagement by the upper keeper slot while the lower stud 52 is cleared from engagement with its slot. Under these conditions, where the final positive accumulation is in the upper register, shifting of the rocker post 119 acts to drive the disc 50 in a clockwise direction so that the pinions in the upper register are shifted into engagement with the add side of their racks. At the same time, the pinions in the lower register are urged downwardly to engagement with the subtract side of their racks but they are blocked from moving into mesh by the action of the blocking plate 195, so that the only movement permitted the pinions in both registers is that which carries the pinions of the upper register upwardly into mesh with the add side of their racks. In consequence, when the subtotal is taken it is drawn from the upper register.

Although the subtotal taken from the upper register is a positive accumulation, it is nevertheless a mathematical negative total. When a total is drawn from the upper register, a type bar, not shown, containing a suitable signal indication is controlled by that register in its total taking operation to designate the sign of that total.

When either a total or a subtotal is taken, the register pinions are brought forcibly into zero position against the holding action of fixed stop means which determines the zero point. Movement of the racks in returning the pinions to the zero stop position exerts a force which tends to cam the registers out of mesh with the racks at the instant the pinions are arrested at zero position. In order to eliminate possibility of unauthorized camming of the register pinions out of mesh at this stage, this invention incorporates means for locking the pinions in mesh until the effective force of the impact of the pinions reaching zero stop position has been removed. This means, in the case of the pin 48 of the shifting mechanism for the lower register, comprises a depending finger 210 pivoted at its upper end on a stud 211 carried by the adjacent side wall 40. The finger 210 is urged rearwardly by a contractile biasing spring 212 connected between a point of attachment on the finger and a point of attachment on the adjacent wall 40. The shank of the finger is reverted to provide a shoulder 213 that is adapted to engage beneath the pin 48 when it has been moved upwardly by shift of the lower register pinions to the add side of their racks during movement of the operating member. Normally, prior to movement of the operating member, the ear 191 on the extension 192 of the bell crank lever 184 engages and cams forwardly the bottom end portion 214 of the latching finger 210 so that the shoulder 213 is disposed out of the path of movement of the pin 48. When the operating frame starts forward it clears the cam 188 and the bell crank lever 184 rocks to move the ear 191 rearwardly, as shown in Fig. 14, so that the finger 210 is permitted rearward movement under the urge of the spring 212, whereupon it moves into position beneath the pin 48 when the pin is moved upwardly. When the latching shoulder 213 is engaged beneath the pin 48 it holds the register pinions in mesh with their racks and prevents the disengagement, previously described, due to the impact of the pinions against their stop members when they arrive at zero position. The latching means for the rod 45 of the shifting mechanism for the pinions of the upper register comprises a shoulder 215 on the rear edge of a second bell crank lever 216 that is fulcrumed alongside the lever 184 on the same fulcrum stud 185. The lever 216 is disposed between the lever 184 and the adjacent wall 40. The lower arm of the lever 216 is substantially identical with the lower arm of the lever 184 and it is similarly provided with a cam portion 217 which normally seats on top of the operating member when that member is at its rearmost limit position. When the operating member moves forward it clears the cam 217 and the lever 216 rocks under the bias of a spring 218 to move the shoulder 215 beneath the rod 45 when the rod moves upwardly to mesh the upper register pinions with the add side of their racks. The shoulder 215 functions similarly to the shoulder 213 in that it latches the pinions of the upper register against camming out of engagement by the force of the impact resulting from return of the pinions to their zero stop positions.

Since in a subtotal operation the pinions of the register in which the total is taken remain in mesh with their racks throughout the total taking cycle, the latching shoulders 213 and 215 are permitted to remain in latched position throughout the major portion of the cycle. However, since in total taking it is necessary that the pinions be taken out of mesh after the total is taken, means, later described, acting from the operating member coacts with lateral extensions 219 and 220 on the respective levers 216 and 184 to rock the levers forwardly, whereby the shoulders 213 and 215 are moved out of latching position.

The upper left hand rear end of the frame of the operating member OP has secured thereto a rigid upright 221 provided with a laterally directed flange 222 which extends in the direction of the adjacent wall 40, see Fig. 16. When the operating member arrives near the end of its forward movement in the first half cycle, the flange 222 engages the lateral extensions 219 and 220 to rock the bell crank levers 216 and 184 forwardly so that the latching shoulders 213 and 215 are moved out of their latching position. When these shoulders are cleared, the register pinions are conditioned for shifting by the regular shifting mechanism of the machine. When the operating member OP begins its rearward movement in the second half of the cycle, the flange 222 moves away from its holding engagement with the extensions 219 and 220 so that the levers are free to rock under the pull of their biasing springs for re-engagement of whichever latching shoulder is free to move rearwardly by virtue of the elevated position of either the rod 45 or pin 48. When the operating member arrives at the rear end portion of its travel in the second half cycle, it engages the cams 188 and 217 to rock the bell crank levers 184 and 216 forwardly whereby to remove the shoulders 213 and 215 from holding position. The above described engagement and disengagement of the latching shoulders occurs in the normal computing cycle operations in the machine as well as during subtotaling and totaling.

*Totaling operation*

Figures 18, 19, 20:
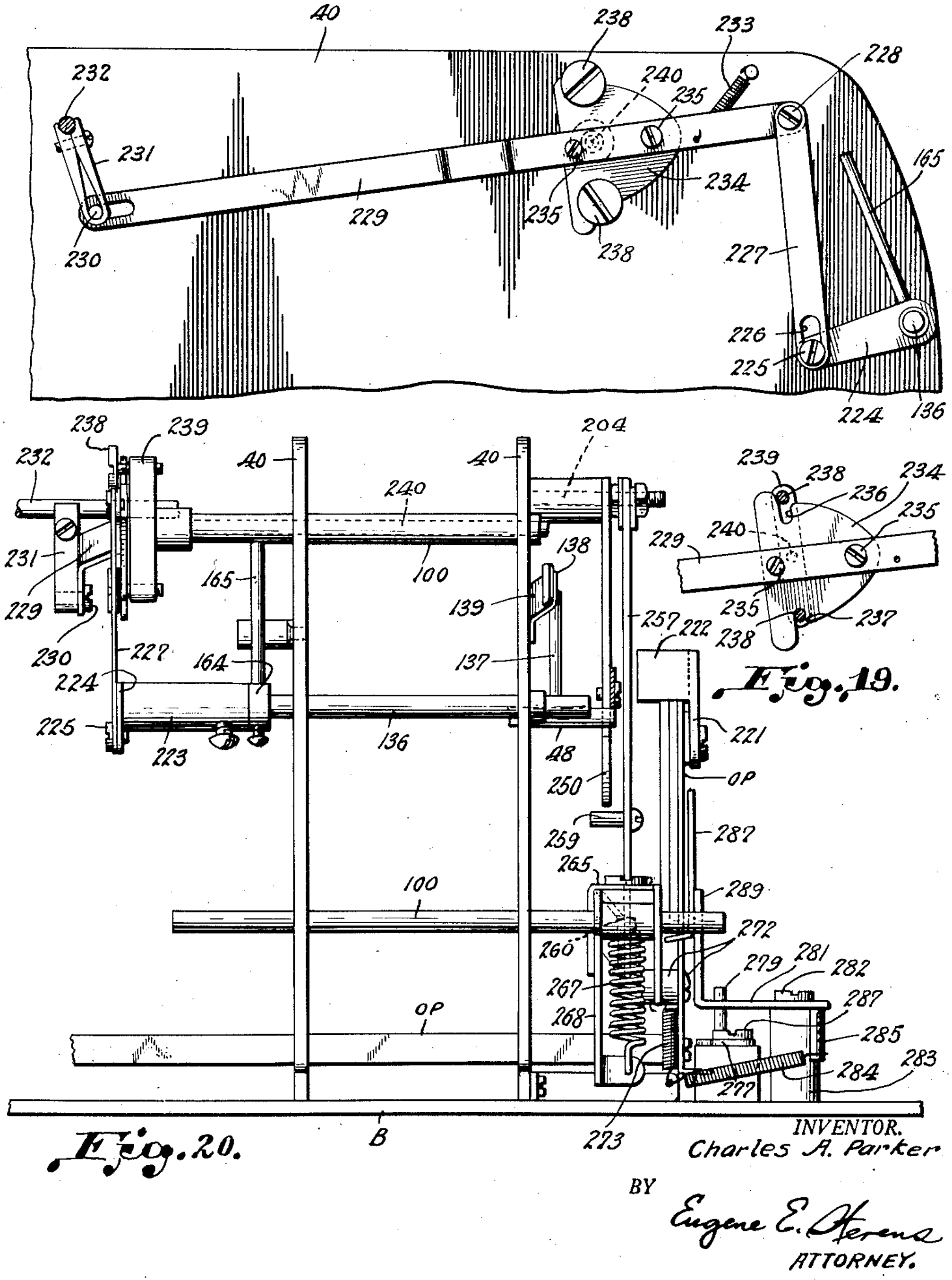
Fig. 18 is a fragmentary elevation at the right hand side of the machine illustrating details of control mechanism operated on actuation of the total key.
Fig. 19 is a view illustrating detail in Fig. 18.
Fig. 20 is substantially a rear end elevation illustrating the disposition of mechanism shown in Figs. 17 and 18.

For purposes of explanation of the total taking operation, let it be assumed that the highest order pinion in the upper register has acted through the upper register rocker 143 and the arm 144 to depress the selector 140 so that the selector pin 137 is in its forward position, whereby the upper register has conditioned the lower register by selecting the lower register for total taking. In this position the blocking pin 165, see Fig. 18, is in its forward position and is held by the engagement of the pin 137 with the detent 139. In moving to its forward position the shaft 136 rocks counterclockwise with respect to Fig. 18 and correspondingly rocks a rigidly attached sleeve 223, see Figs. 10 and 20. The sleeve 223 has rigidly secured thereto a crank 224 provided at its free end with a lateral stud 225 that plays in a closed end slot 226 in the lower end of a depending link 227 that at its upper end has a pivotal attachment 228 with the rear end of a substantially horizontal lever 229. The forward end of the lever 229 has a pivotal connection 230 with a depending member 231 fixedly secured to a shaft 232 that constitutes a control element operated by mechanism influenced by actuation of the total key of the machine. Whenever the total key is moved to its fully actuated position the shaft 232 is rotated clockwise with respect to Fig. 18, so that the lever 229 is pulled forwardly. When the total key is released, mechanism not forming a specific part of this invention reversely rocks the shaft 232 so that the lever 229 is moved rearwardly back to its original position. The lever 229 normally is biased rearwardly and upwardly by a contractile spring 233 connected between a point of attachment on the adjacent wall 40 and the shank of the lever.

In the forward position of the blocking pin 165, as in Fig. 18, the crank 224 on the selector shaft 136 rides the stud 225 down to pull the rear end of the lever 229 downwardly against the bias of spring 233. In moving downwardly, the lever 229 correspondingly shifts a locator element 234 that is rigidly secured thereto by securing elements 235. The locator 234 is substantially heart-shaped and is provided in its upper edge with an inwardly directed slot 236 and with a similar slot 237 in its lower edge. These slots are adapted, depending upon the position to which the lever 229 is shifted, for selective engagement with either of a pair of lateral studs 238 rigidly secured to a block 239 that is fixed to a shaft 240 for rotation therewith. The point of attachment between the block 239 and the shaft 240 is located intermediate the ends of the block, and the edge portion of the locator member rearwardly of the slots is arcuately curved to accommodate passage thereover of either stud 238 that is moved rearwardly by rocking of the block 239. The shaft 240 extends axially through the shaft 100 of the upper register reset mechanism; the shaft 100 in this instance being a sleeve shaft. The shaft 240 extends at its ends beyond the adjacent ends of the shaft 100.

With reference to Figs. 18, 19 and 20, it will be apparent that when the locator 234 is positioned to engage its lower slot 237 over the lower pin 238, forward movement of the lever 229, upon actuation of the total key, effects a corresponding clockwise rocking of the block 239 so that the shaft 240 is correspondingly rocked. Whenever the blocking pin 165 is moved to its rear position by rotation of the selector shaft 136, the link 227 is free to move upwardly so that the rear end of the lever 229 is also free to upward movement under the pull of the spring 233, whereby to shift the locator 234 upwardly to release the lower stud 238 and to engage the upper stud 238 in the upper slot 236. In this position of the parts, forward movement of the lever 229 upon actuation of the total key acts to rock the block 239 in a counterclockwise direction to effect a similar rotation of the shaft 240.

Figures 21, 26, 27:
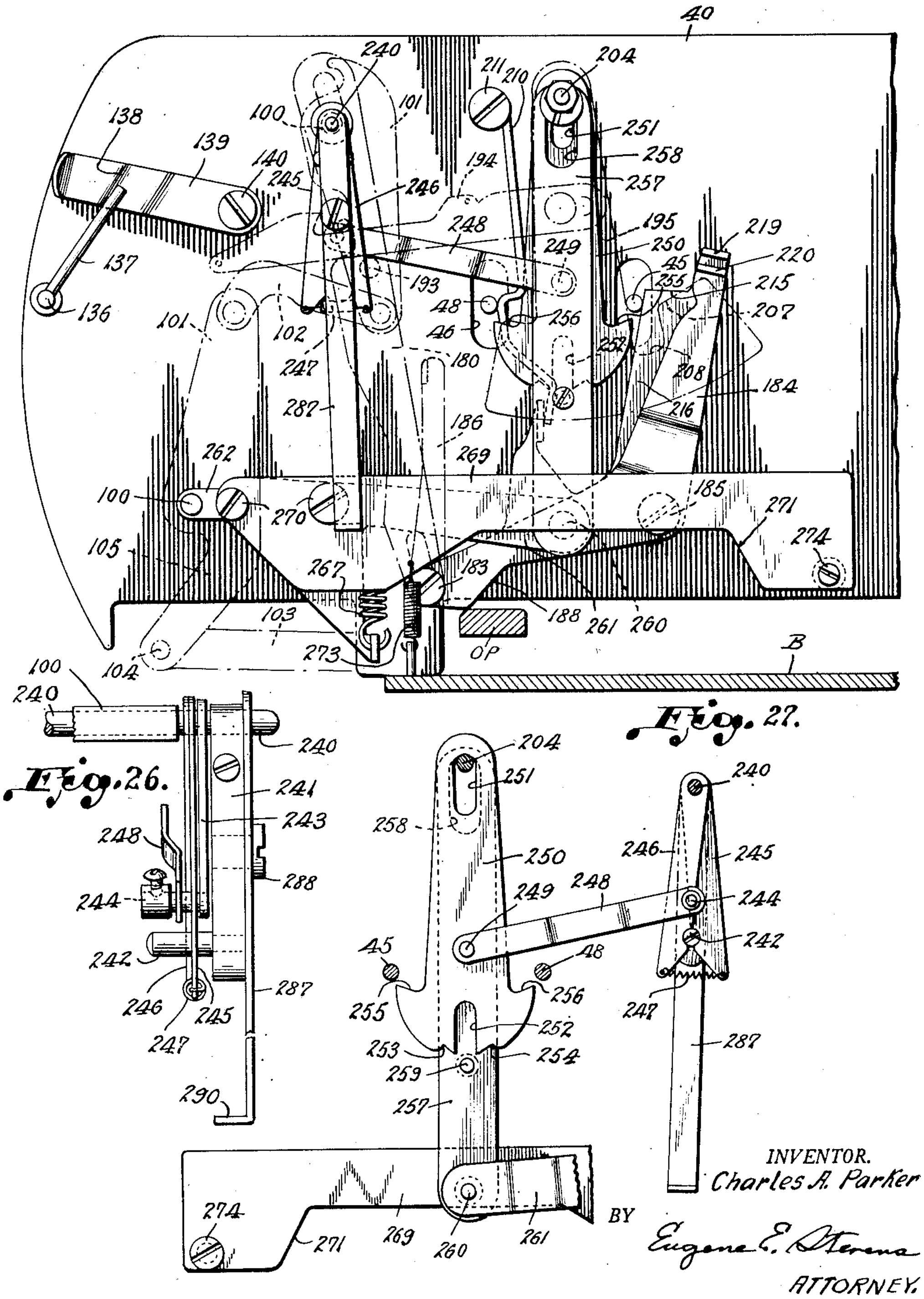
Fig. 21 is an elevation similar to that of Fig. 17 with parts removed for illustration of detail.
Fig. 26 is a fragmentary rear end elevation illustrating details of the totaling mechanism.
Fig. 27 is an elevation of detail of elements of the totaling mechanism in which the parts are viewed from the side opposite that shown in Fig. 22.

The end of the shaft 240 which projects at the left hand side of the machine has rigidly secured thereto for rotation therewith a depending block 241 provided at its lower end with a laterally and inwardly directed stud 242. This structure is best shown in Figs. 26 and 27. By reason of the rigid attachment of the block 241 to the shaft 240, the block 241 rocks correspondingly to the rocking of the block 239 at the opposite end of the shaft. Inwardly of the block 241 and closely adjacent thereto there is disposed a suspended plate 243 that is pivotally mounted on the shaft 240 at its upper end and which has secured to its lower end an inwardly directed stud 244. Both the stud 242 on block 241 and the stud 244 on the plate 243 are engaged between the opposed edges of a pair of overlapped links 245 and 246, each of which is freely suspended pivotally at its upper end on the shaft 240. The lower ends of the two links are connected by a contractile spring 247, so that the links are urged together in convergent relation for clamping engagement over the studs 242 and 244. This arrangement provides a yieldable connection whereby directional movement of the block 241, acting through the lower stud 242, propels one of the links, while at the same time the other is pulled in the same direction by the spring 247. The lug 244 on the plate 243 provides a pivotal connection for the rear end of a link 248 which at its front end has a pivotal connection 249 with the shank of a vertically disposed flying lever 250. The upper end of the flying lever has a closed-end slot 251 whereby the lever is freely and pivotally suspended from the stud 204 on which the blocking plate 195, previously described, also is pivoted. It will be apparent that directional movement of the block 241 is transmitted through the link 248 to effect similar directional swinging movement of the flying lever 250. The lower end of the lever is provided with a longitudinally extending axial slot 252 which opens at its lower end intermediate a pair of sockets 253 and 254 provided in the lower edge of the lever. The shank of the lever 250 is further provided with oppositely directed shoulders 255 and 256 which are adapted, respectively, to engage beneath rod 45 and pin 48 when the lever is swung in the appropriate direction.

An elevator link 257 is disposed vertically alongside the flying lever 250 at the outside thereof and is provided at its upper end with a closed end slot 258 by which it is freely and pivotally suspended over the stud 204. The shank of the elevator link is provided with a laterally directed stud 259 that normally plays vertically in the flying lever slot 252 when the flying lever is in its neutral position, as shown in Fig. 27. The lower end of the elevator link has a pivotal connection 260 with an arm 261 that forms a portion of a multipart lever which is pivoted to be swung upwardly by action of the operating member when it arrives at the end of its forward travel in the first half of the cycle.

The multipart lever comprises, in addition to the arm 261, a horizontal block 262 to which the rear end of the arm 261 is pivoted as at 263. The block, in turn, has a pivotal connection 264 at its rear end over the shaft 100 of the lower register reset mechanism. The forward end of the block 262 mounts on its upper face a transverse plate 265 which overlies the upper edge of the arm 261 and which is secured to the block by suitable attaching means 266. This plate provides a point of attachment for the upper end of a relatively heavy contractile spring 267 that is attached at its lower end to a downward extension 268 of the arm 261. The multipart lever further includes a forwardly extended shank 269 rigidly secured to the block 262 by securing elements 270 on the side of the block opposite to that which pivots the arm 261. The lower edge of the shank portion 269 is recessed longitudinally to provide at its forward end a cam 271 that cooperates with a lateral stud 272 carried by the rear end of the operating member. The operating member stud 272 normally plays in the space provided by the longitudinal recess in the bottom edge of the shank 269, and when the operating member nears the forward end of its travel in the first half cycle, its stud 272 engages the cam 271 to shift the shank portion 269 upwardly into the position shown in Fig. 22. This movement of the portion 269 acts through the spring 267 for a yielding corresponding lift of the arm 261 which thereby carries up its stud 259. In normal computing operations the flying lever 250 occupies its neutral position, so that in moving up, the stud 259 on the elevator link 257 rides idly up within the slot 252 and no vertical motion is imparted to the flying lever. As the operating member moves rearwardly in the second half of its cycle, the stud 272 clears the cam 271, whereupon the multipart lever drops down to its original position under the bias imparted by a contractile spring 273 connected between a point of attachment on the shank 269 and the base B of the machine. This movement carries down the elevator link stud 259 into a position which clears the lower end of the flying lever 250.

It must be remembered that when a total is taken the pinions in the selected register are shifted to the add side of their racks at the beginning of the forward stroke of the total taking cycle. At this time both the blocking plate 195 and the flying lever 250 are positioned to block downward shifting of the pinions in the other register. This invention provides a means by which the total taken from the selected register is transferred additively into the other register during the back stroke in the second half of the total taking cycle in order to return the pinions to zero position. This transfer is accomplished by a positive drive imparted from the operating member, acting through the agency of the multipart lever and the elevator link 257. It must be remembered also that actuation of the total key will have already swung the flying lever 250 before the beginning of the total taking cycle. Under these conditions the stud 259 of the elevator link is disposed for engagement with whichever of the sockets 253 or 254 is registered therewith by shift of the flying lever. When the elevator link moves upwardly, as previously described, the stud 259 engages in the registered socket and thereby correspondingly lifts the flying lever 250 so that its shoulder, which is engaged at the time beneath the rod 45 or pin 48 as the case may be, correspondingly effects a shift of that set of pinions upwardly to the add side of their racks.

Figures 17, 23:
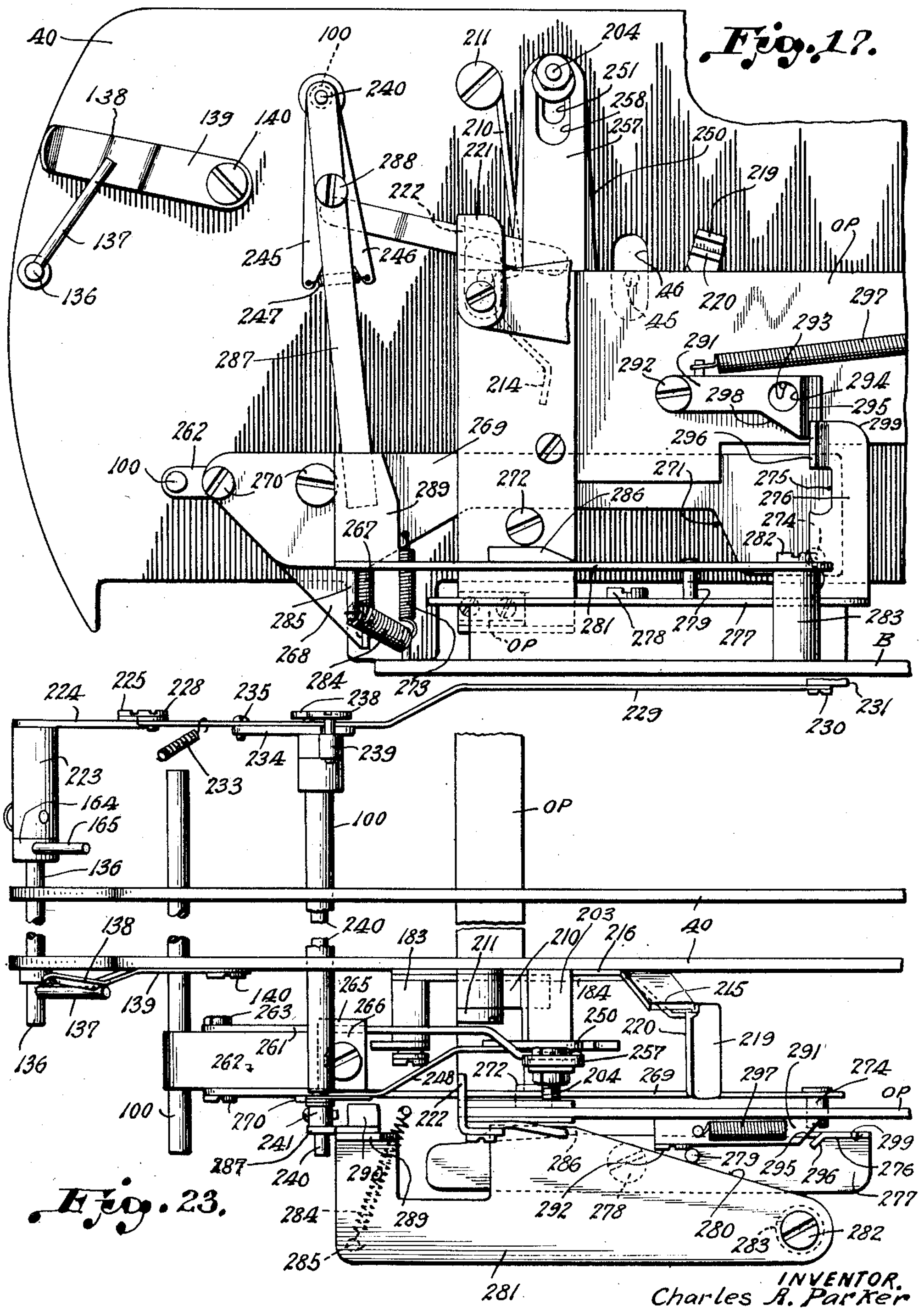
Fig. 17 is an elevation illustrating details of mechanism, also at the left rear end portion of the machine, employed in connection with totaling operations as distinguished from subtotaling.
Fig. 23 is a top plan view illustrating disposition of the parts concerned with the totaling operations.

This condition must be maintained during the return movement of the operating member during the second half of the total taking cycle in order that the total taken during the first half cycle may be added into the other register during the second half cycle. In the present embodiment of the invention this is accomplished by means which latches the multipart lever in its raised position until released when the operating member is next cycled following the total taking cycle. The structure of the latching means comprises a lateral stud 274 on the forward end of the shank portion 269, which stud is adapted to be engaged over the bottom end of a recess 275 in the rear edge of a vertical keeper 276 that is carried by the forward end of a horizontal latch lever 277. The latch lever 277 is pivoted as at 278 on an element of the machine base for oscillation in a horizontal plane. In the normal position of the parts, the keeper 276 is disposed, as shown in Fig. 23, outwardly with respect to the stud 274 so that there is clearance between the two. The latch lever is shifted to rock its forward end laterally inward to engage the stud 274, when the stud is elevated by action of the operating member engaging the cam 271, through the agency of force laterally applied on an upstanding stud 279 on the shank of the latch lever forwardly of its pivot. The stud 279 contacts the inclined inner edge 280 of a horizontally disposed rocker lever 281 that is pivoted as at 282 at its forward end to a support element 283 of the machine base. The rear end of the rocker lever 281 is urged laterally inward toward the adjacent frame wall 40 by means of a contractile spring 284 connected between a depending lug 285 on the rocker lever and a point of attachment on the machine base.

When the operating member occupies its rearmost position, a flange 286 on the inner edge of the rocker lever 281 engages against an element of the operating member, so that the rocker lever cannot be rocked inwardly until the operating member has moved sufficently far forward to permit the lever to swing inwardly behind its rear end. When the operating member has advanced forwardly sufficiently to permit the necessary inward movement of the rocker lever, and provided no other means is blocking movement of the rocker lever, the inward swing of the lever acts against the stud 279 of the latch lever to urge the latch lever for movement shifting its forward end laterally inward against the end of the stud 274. When the operating member arrives at the forward limit of its travel, the stud 272, acting on the cam 271 of the multipart lever shank 269, lifts the stud 274 in the manner previously described. As soon as the stud 274 rises to the zone of the keeper recess 275, the latch lever snaps inwardly to engage the bottom of the keeper recess beneath the stud and thereby to hold the multipart lever and the elevator link 257 in raised position until the latch is released.

The operation just described assumed that the lever 281 is free to rock following clearance by the operating member in moving forwardly, which would be the case in a totaling cycle. In any normal computing cycle of the machine, movement of the rocker lever 281 is arrested by a blocking lever 287 that is vertically disposed at the left hand side of the calculating unit frame. This blocking lever 287 is fixedly secured by suitable attaching means 288 to the block 241, and it depends therefrom with its lower end portion disposed in the horizontal zone of an upright stop flange 289 carried by the rear end of the rocker lever 281. A laterally directed lip 290 on the lower end of the lever 287 provides a limiting means between the lower end of the lever and the rear end of the shank portion 269 which prevents undesirable inward angling of the lower end of the lever 287 under the urge of the spring 284 which biases the rocker lever 281 inwardly. In the position of the parts during normal computing cycle operation of the machine, the lower end of the lever 287 is disposed behind the stop flange 289 of the rocker lever 281, so that when the operating member in moving forwardly clears the rocker lever, this lever cannot rock inwardly because of the blocking effect of the lever 287. As previously explained, actuation of the total key, operates through mechanism previously described to swing the block 241 so that the lower end of the lever 287 is carried out of blocking position, whereby the lever 281 is free to rock inwardly when cleared by advancing movement of the operating member.

At the conclusion of a total taking cycle, the latch lever keeper 276 remains engaged with the stud 274 and mechanism is provided for releasing the latch at the beginning of a cycle of the operating member immediately following the total taking cycle. This means comprises a dog 291 pivoted at its rear end as at 292 to the left hand side of the frame structure of the operating member for limited vertical shifting to the extent permitted by a stop pin 293 carried by the operating member frame and which engages in an aperture 294 in the dog. These parts are shown in Fig. 17 and in Fig. 23. The forward end of the dog has a cam portion 295 that cooperates with a cam tip 296 on the upper portion of the keeper 276 above the recess 275. When the operating member moves forward, the cam 295 contacts the cam 296 to shift the latch lever outwardly into a position in which it releases its holding action on the stud 274, whereupon the multipart lever assembly drops down to its original position under the bias of the spring 273. This downward movement of the multipart lever correspondingly lowers the elevator link 257, whereupon the flying lever 250 is permitted to swing back to its neutral position and at the same time is permitted downward vertical movement to release its holding engagement with either the rod 45 or the pin 48, thereby permitting the register pinions to shift to neutral disengaged position. A spring 297 connected between the dog 291 and an element, not shown, of the operating member, normally biases the dog to swing downwardly to dispose its cam portion 295 in a position to engage the keeper cam 296. As the operating member returns in the second half of its cycle, a cam 298 on its bottom edge engages the rounded forward tip 299 of the latch keeper, so that the dog rides up and over the keeper to assume its normal position when the operating member comes to rest.

*Recapitulation*

From the above detailed description it will be apparent that the same coincidence of at least two operating conditions of the pinion of highest numerical order in each set of pinions determines the selection of a register from which a total or subtotal is to be taken. Specifically, in the present embodiment, these conditions constitute the status of the pinions with respect to add position or subtract position, and the status of the pinions with respect to tens transfer. It may be practicable, and it is within the purview of this invention, that other specific operating conditions may be taken advantage of for determining selection of the register. Whenever a set of pinions in either register is in a condition in which the pinion of highest numerical order has been operated transferringly, and when at the same time that set of pinions is positioned for subtraction, that set of pinions in which these conditions coincide acts to shift the selector means whereby the other set of pinions is conditioned for total or subtotal taking. This means that the total or subtotal will always be taken from the register which holds the final positive accumulation prior to total taking.

In the mechanism of this invention, during a normal computing operation, one set of pinions always hold the complement of the other set. The two sets, although independent, have an identical zero point position from which they rotate in one direction to add and in the opposite direction to subtract, and to which they are returned in the process of totaling. In normal computing operation, when an entered item is above zero, addition is performed in the lower register while the same amount is simultaneously subtracted in the upper register. In the course of listing a number of items in which the algebraic sign changes, the mathematical accumulation constantly varies in both registers as the pinions pass the zero point in opposite directions of rotation. Whenever the mathematical accumulation in the lower register passes below zero, the accumulation at that instant passes above zero in the upper register, and vice versa. By virtue of this interposition, whenever the mathematical accumulation in a set of pinions rotating in a subtraction direction with respect to its zero point effects a transfer operation of the highest order pinion, the rocker 143 for that set of pinions is actuated to shift position of the selector 140 so that the total taking mechanism is conditioned for operation from the other register, in which the accumulation at that instant will be positive. In the normal course of operation the position of the selector will be changed as often as the conditions of the registers require it. This change of position of the selector, during the normal computing operation of the machine, has no positive effect; it merely establishes a condition. When a subtotal is to be taken, actuation of the subtotal key operates mechanism which brings both sets of pinions to neutral position, and also operates the reset mechanism following disengagement of the pinions and before the operating member is cycled. The position of the selector at the instant of actuation of the subtotal key determines the position which will be assumed by the blocking pin 165. As previously stated, the pinion shifting mechanism normally is conditioned for addition in the lower register. Simultaneously with operation of the subtotal key, the link 177 is shifted rearwardly to remove the blocking influence of the lever 173 with respect to the lever 166. If at this instant the accumulation existing in the lower register is above zero, the blocking pin 165 remains engaged beneath the rear end of the lever 166, so that the pinions of the lower register will be shifted into their add position for total taking when the machine is cycled. If the accumulation is above zero in the upper register at the instant of operation of the subtotal key, the selector will have been actuated to shift the blocking pin 165 out of its position beneath the rear end of the lever 166; so that when the blocking lever 173 also is removed from its blocking position, operation of the reset mechanism, acting through the spring 172, rocks the rear end of the lever 166 downwardly and correspondingly elevates its forward end to shift the lever 116 to engage the upper stud 52, so that when the shifting mechanism is operated the pinions will be moved to the add side of the upper register and at the same time the pinions in the lower register will be urged to move to the subtract side of their racks. Before this movement occurs, the blocking plate 195 will have been shifted into position to prevent downward movement of the pinions in the lower register, so that the set of pinions in the lower register is prevented from moving to subtract position. Coincident with upward movement of the set of pinions in the upper register, the latching shoulder 215 is conditioned to move beneath the rod 45 to latch the upper pinions in mesh with the add side of their racks. This latching operation is accomplished when the operating member starts to move forward and remains substantially in effect during the subtotaling cycle and until the operating member returns to its normal rearmost position at the conclusion of the cycle. For a brief interval of the cycle, when the operating member nears the forward limit of its travel in the first half cycle, the latch shoulder 215 will be disengaged by the action of the flange 222 on the operating member as it engages the extension 219. When the operating member starts back in the second half of its cycle, the latch shoulder is reengaged and continues in this position until the end of the cycle, at which time it is released. During the second half of the subtotaling cycle the pinions of the upper register remain in mesh so that the accumulation drawn from that register in taking the total is returned into the register. During the subtotaling cycle the set of pinions in the lower register is held by the blocking plate 195 so that it is prevented from moving into subtract mesh with the racks. When the operating member comes to rest at the end of the subtotaling cycle, the reset mechanism will have been returned to normal position, so that the blocking plate 195 is urged to move forwardly out of blocking position by the bias of the spring 202. This movement, however, is prevented by the downward pressure of the pin 48 acting against the shoulder 206 on the blocking plate, so that the blocking plate is not free to move out of its blocking position. At the start of the following cycle of the operating member, the normal register shifting mechanism operates to relieve the pressure exerted by the pin 48 so that the blocking plate 195 is permitted to swing out of blocking position.

In a totaling operation, except for the fact that the set of pinions from which the total is taken is brought out of mesh at the beginning of the second half cycle, the mechanism operates substantially as in the case of subtotal taking. All of the subtotal mechanism comes into play during the operation of total taking and acts in conjunction with additional mechanism that functions only when the total key is actuated. Upon actuation of the total key, the pinions in both registers are brought out of mesh and the reset mechanism is operated prior to the start of the total taking cycle. At this time the selector will have functioned to select the register from which the total is to be taken. The position of the selector also determines the disposition of the locator 234, Fig. 18, so that when the total key is actuated it operates mechanism governed by the disposition of the locator which functions to shift the flying lever 250 into position beneath the set of pinions of the register which remains idle while the total is taken. It must be remembered that the blocking plate 195 also is positioned to prevent downward shifting of the pinions in both registers. When the operating member moves forward in the first half of the cycle, mechanism operates to shift the pinions so that the pinions of the totaling register are moved up into mesh with the add side of their racks while the pinions of the other register are urged to move down but are prevented from such movement by the blocking plate 195. When the operating member nears the end of its forward first half cycle, the multipart lever is shifted upwardly so that the flying lever 250 is correspondingly elevated to move the pinions of the non-totaling register upwardly into mesh with the add side of their racks, for the purpose of adding into that register the accumulation taken from the totaling register. When in this position, the mechanism is latched so that the pinions of the non-totaling register are held in mesh with their racks for the necessary additive computation during the return of the operating member through the second half of its cycle, and they are held in this position until released at the start of the following cycle of the operating member. When the operating member starts to move rearwardly during the second half of the total taking cycle, the set of pinions from which the total was taken are shifted out of engagement with their racks and returned to neutral position.

An important factor to be considered in connection with the operation of totaling is that both sets of pinions are restored to their zero positions during the total taking cycle. The set from which the total was taken is returned to zero position during the first half of the cycle, and the other set is restored to zero position during the second half of the cycle. This restoration to zero position during the second half cycle is accomplished by transferring to the non-totaling register the computation existing in the totaling register at the time the total was taken.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention as claimed.

I claim:

1. In a calculating machine having two separate and independent registers including a group of pinions and each being adapted to add and the other simultaneously to subtract the same item during a computing operation, conditioning means operable from an element of the highest order pinion in each register to condition one of the registers for total taking, and a member movable between two positions in one of which it holds the conditioning means inoperative from said highest order pinion of one register and in the other of which it holds the conditioning means inoperative from the highest order pinion of the other register.

2. In a calculating machine having two separate and independent sets of pinions one being adapted to add and the other simultaneously to subtract the same item during a simultaneous computing operation of both sets, means for shifting the sets of pinions in each register to reverse function, means operative from each set by the highest order digit pinion therein to condition the other set for total taking, holding means adapted to prevent operation of said conditioning means by one set of pinions, and means governed by one set of pinions upon shifting for a predetermined one of its functions to disable the holding means.

3. A calculating machine having a cyclically actuated operating means, two independent sets of register pinions, a tens transfer mechanism for each set of pinions, and means to reset said transfer mechanisms, pinion shifting means having two positions of adjustment, and operable by said operating means in an accumulating cycle to shift both sets of pinions to effect addition on one set and subtraction on the other set in one of said positions of adjustment and to shift both sets of pinions to effect subtraction on said one set and addition on said other set in the other of said positions of adjustment, said pinion shifting means being also operable by said operating means in a total taking cycle to shift said one set of pinions for positive total taking in said one position of adjustment and to shift said other set of pinions for positive total taking in said other position of adjustment, total taking control means, a spring-powered means releasable by said total taking control means to operate said reset means prior to actuation of said operating means in a total taking cycle, means controlled by the highest order pinions of both of said sets in accordance with the algebraic signs of the accumulations therein, and means operable by said spring-powered means and controlled by said highest order pinion controlled means to adjust said pinion shifting means to shift for positive total taking that one of the two sets of pinions which has the algebraically positive accumulation therein.

4. In a calculating machine, two separate sets of register pinions shiftable into and from add and subtract positions, a control element movable to condition the machine for total taking, means actuated in response to movement of the control element to determine the direction in which the pinions shift, means also actuated in response to movement of the control element to prevent the shifting of either set of pinions to one of their positions, means operative by a pinion in each set during a computing operation thereof to select one set for total taking, and said selecting means governing the operation of the shift direction determining means whereby to condition the selected set of pinions for shifting to position to enable total taking.

5. In a cycle operation calculating machine having two separate sets of pinions and cooperating racks, resilient means for normally shifting the sets to and from rack mesh for computing operation of the pinions, an auxiliary shifting means, and means operative in a total taking operation of the machine to cause said auxiliary shifting means to supersede the normal resilient shifting means for one set of the pinions in a total taking cycle.

6. In a calculating machine including two separate and independent sets of register pinions which simultaneously receive items in each that differ in algebraic sign in an indeterminate sequence of entry, and wherein the pinions in each set compute oppositely to those in the other and are adapted to give a total through total taking means operable with either set, means settable responsive to movement of the highest order pinion in each set of pinions to prevent total taking from one of the sets, and means responsive to receiving of an item of one algebraic sign in the sets to disable operation of the settable means whereby the settable means will be incapable of response to movement of the highest order pinion from one of the sets of the pinions.

7. In a calculating machine having a pair of registers and cooperating pinions for each register normally operable simultaneously for addition in one register and subtraction in the other during a computing cycle of operation and each pinion of the highest order in each register having an element movable therewith, means shiftable between two positions of adjustment for conditioning the machine for total taking from one register when in one position of adjustment and for total taking from the other register when in the other position of adjustment, actuating means for shifting said conditioning means to one of its positions of adjustment responsive to movement of the highest order pinion element in one register and to the other of its positions of adjustment responsive to movement of the highest order pinion element in the other register, and means shiftable to one position to block said actuating means from operation by said pinion element of one register and to another position to release said actuating means for operation by that register pinion element.

8. In a calculating machine of the type described having two separate sets of racks and pinions cooperating therewith simultaneously to register by addition in one and subtraction in the other during a computing cycle, means shiftable between two positions of adjustment for conditioning the machine for total taking from one set when in one position of adjustment and for total taking from the other set when in the other position of adjustment, individual actuating means cooperating with each set of pinions for shifting said conditioning means to one of its positions of adjustment responsive to the highest order pinion in said sets of pinions, control means shiftable between two positions of adjustment to block one of said actuating means in one position and to block the other while in the other position of adjustment, and means governed by one set of pinions to shift the control means to either position in a computing cycle.

9. In a calculating machine having two separate sets of racks and pinions cooperating therewith for simultaneous movement to register by addition in one and subtraction in the other during a computing cycle, means shiftable between two positions of adjustment for conditioning the machine for total taking from one set of pinions when in one position of adjustment and for total taking from the other set when in the other position of adjustment, actuating means for shifting said conditioning means to each of its positions of adjustment responsive to the highest order pinions in said sets of pinions preventing means mounted for movement between two positions of adjustment in one of which it prevents said actuating means from shifting said conditioning means toward one position of adjustment and in the other of which it prevents said actuating means from shifting the conditioning means toward the other position of adjustment, and means responsive to the algebraic conditioning mechanism operative during the computing cycle for actuating said preventing means to one of said positions.

10. In a calculating machine of the type described having two separate sets of racks and pinions cooperating therewith each shiftable to an algebraic position to register by addition in one and subtraction in the other during a computing cycle whereby one set has the true total and the other the complement thereof, an algebraic total control member shiftable between two positions of adjustment for conditioning the machine to take the total from one set when in one position of adjustment and from the other set when in the other position of adjustment, means operable by the highest order pinion of each of said sets upon change of algebraic sign of the accumulation in said set to rock the algebraic total control member to one of its positions of adjustment to condition the machine for total taking and means governed by the algebraic position of the sets of pinions to prevent said means operable by said highest order pinions from moving the total control member to change its positions of adjustment.

11. In a calculating machine having two separate sets of racks and pinions cooperating therewith for simultaneous movement to register by addition in one and subtraction in the other during a computing cycle whereby one set has the true total and the other the complement thereof, an algebraic control member shiftable between two positions of adjustment for conditioning the machine to take the total from one set when in one position of adjustment and from the other set when in the other position of adjustment, shiftable means operable by either of the sets of pinions during a computing cycle to shift the algebraic control member to one of its positions, means normally urged to block operation of said shiftable means by one set of pinions when the item being registered is of one algebraic sign, and means responsive to movement of the sets when the item registered is of the other algebraic sign to shift said blocking means to a position to block operation of said shiftable means by the other set of pinions.

12. In a calculating machine having two separate sets of racks and cooperating pinions normally shiftable into and out of engagement with said racks, one being adapted to add and the other to subtract simultaneously during a computing cycle of operation, selector means shiftable into one of two positions of adjustment responsive to the algebraic condition of said sets, and an operative connection between said selector and pinions whereby one set of pinions is conditioned to be shifted into position for total taking when the selector is in one position of adjustment and the other set of pinions is conditioned to be shifted into position for total taking when the selector is in the other position of adjustment independent of the normal shifting movement of said pinions.

13. In a calculating machine having two separate sets of racks and cooperating pinions normally shiftable into and out of engagement with said racks, one being adapted to add and the other subtract the amount simultaneously during a computing cycle whereby one set has the true total and the other the complement thereof, a selector shiftable between two positions of adjustment responsive to the algebraic condition of the sets, means for urging shifting movement of the pinions of one set in one direction for total taking and the other set in the opposite direction, and means responsive to the position of the selector for determining which pinions may be shifted into position for total taking.

14. In a calculating machine having two separate sets of racks and cooperating pinions normally shiftable into and out of engagement with said racks, one being adapted to add and the other subtract the amount simultaneously during a computing cycle whereby one set has the true total and the other the complement thereof, a selector shiftable between two positions of adjustment responsive to the algebraic condition of the sets, means for urging shifting movement of the pinions of one set in one direction for total taking and the other set in the opposite direction for total taking, means responsive to the operation of the selector for determining which pinion is to be shifted into position for total taking, and means operative responsive to conditioning the machine for total taking for blocking movement of each of said pinions in directions other than for total taking.

15. In a calculating machine of the type described having two separate sets of racks and cooperating pinions normally shiftable into and out of engagement with said racks, one being adapted to add and the other subtract the amount simultaneously during a computing cycle whereby one set of racks and pinions has the true total and the other set the complement thereof, a selector shiftable between two positions of adjustment responsive to the algebraic conditions of the sets, means normally urging shifting movement of the pinions of one set in one direction and the other set in the opposite direction, a lever pivoted intermediate its ends, a resilient connection between said lever and said pinion shifting means, means constantly urging rocking movement of said lever about its pivot in a manner to render said resilient connection effective for causing movement of the pinion shifting means opposite normal direction, said selector blocking movement of said lever when in one position of adjustment and releasing said lever for movement when in the other position of adjustment to operate said pinion shifting means in a direction opposite normal.

16. In a calculating machine having two separate sets of racks and cooperating pinions normally shiftable into and out of engagement with said racks, one set being adapted to add and the other subtract the amount simultaneously during a cycle of operation whereby one set has the true total and the other the complement thereof, a total taking means operable with each set of the pinions, a selector shiftable between two positions of adjustment responsive to the algebraic condition of the set, means normally urging shifting movement of the pinions of one set in one direction and the other set in the opposite direction in a cycle of operation, and means operative by the set having the complement of the true total to shift the selector into position to block shifting of the pinions in the complementary set to mesh position upon operation of the means for total taking.

17. In a calculating machine having two separate sets of racks and cooperating pinions normally shiftable into and out of engagement with said racks, one for adding and the other subtracting the amounts simultaneously during a computing cycle whereby one set has the true total and the other the complement thereof a total taking mechanism operable with either sets of pinions and racks during a cycle of operation, a selector shiftable to either of two positions in response to actuation by said sets of pinions during algebraic change in the total of the sets, an operative connection between said selector and total taking mechanism and shiftable by the selector for shifting the set having the true total for total taking during the first portion of the cycle and for shifting the set having the complement thereof into position for engagement with the racks during the other portion of the cycle whereby the pinions are returned to zero position during the cycle of operation.

18. In a calculating machine having two separate sets of racks and cooperating pinions normally shiftable into and out of engagement with said racks, one set being adapted to add and the other to subtract simultaneously during a computing cycle, selector means shiftable to one of two positions of adjustment responsive to the algebraic conditions of said sets, an operative connection between said selector and pinions whereby one is shifted into position for total taking when the selector is in one position of adjustment and the other is shifted into position for total taking when the selector is in the other position of adjustment independent of the normal shifting movement of said pinions, and means responsive to conditioning the means for total taking to block movement of said pinions in directions other than for total taking.

19. In a calculating machine having two separate sets of racks and cooperating pinions normally shiftable into and out of engagement with said racks, one being adapted to add and the other subtract the amount simultaneously in a computing cycle whereby one set of pinions has the true total and the other the complement thereof, a selector shiftable between two positions of adjustment depending upon which set of pinions has the true total and the other the complement thereof, means normally urging shifting movement of one set of pinions in one direction and the other set of pinions in the opposite direction during a computing cycle, means responsive to conditioning the machine for total taking to block movement of said pinions in directions other than for total taking, and means responsive to the selector for shifting the set having the true total into position for total taking.

20. In a calculating machine having two separate sets of racks and cooperating pinions normally shiftable into and out of engagement with said racks, one being adapted to add and the other set to subtract the amount simultaneously during a computing cycle whereby one set has the true total and the other the complement thereof, a selector shiftable between two positions of adjustment responsive to actuation from the set of pinions bearing the complement of the true total, means normally urging movement of the pinions of one set in one direction and the other set in the opposite direction during a computing cycle, means responsive to conditioning the machine for total taking to block movement of said pinions in directions other than for said total taking, means responsive to the position of the selector for positioning the set bearing the true total in operative position during the forward stroke for total taking and for disengaging the set and engaging the opposite set of pinions into operative engagement during the return portion of the cycle to bring the pinions into zero position.

21. In a calculating machine having two separate and independent sets of pinions one being adapted to add and the other simultaneously to subtract the same item during a simultaneous computing operation of both sets, means for shifting the sets of pinions in each register to reverse function, means operative from each set by the highest order digit pinion therein to condition the other set for total taking, holding means adapted to prevent operation of said conditioning means by one set of pinions, means governed by one set of pinions upon shifting for a predetermined one of its functions to disable the holding means, and a means operable with said holding means when disabled relative one set of pinions to prevent operation of said conditioning means by the other set of pinions.

22. In a calculating mechanism having two separate and independent registers one being adapted to add and the other to subtract the same item during a computing cycle of operations whereby one register would contain the true algebraic total if of positive sign and the other register would contain the complement thereof and if the total were of negative sign the true total and complement would be contained in the registers in reverse order, an operating member movable in a cycle for actuating said registers in an operation thereof, conditioning means settable for one register to total and the other register to add the amount totaled from the first register, total taking means operable with either register, and selective spring operated means under register control releasable by said total taking means to actuate said conditioning means for operation by said operating member thereby to take the total from the register having the true total and transfer same to the register having the complement thereof.

23. In combination with resettable tens transfer mechanism, two independent sets of reversely acting register pinions shiftable oppositely into and from an add position and a subtract position respectively, an operating member movable in a cycle to effect shifting of the pinions into one or the other of the positions, conditioning mechanism operable by each register to select one of said registers for total taking, spring operated reset mechanism operable prior to a cycle of said operating member to reset said tens transfer mechanism, means operable by said reset mechanism and controlled by said conditioning mechanism to connect the total taking means with the register selected by said conditioning mechanism.

24. In a calculating mechanism having two separate and independent registers one being adapted to add and the other to subtract the same item during a computing cycle of operations whereby one register would contain the true total and the other register the complement thereof, an operating member movable in a cycle for actuating said register in a total taking operation, spring operated conditioning means for setting one of said registers to total and the other to compute the amount totaled from the first register, total taking means operable with either register and having means to release said spring operated conditioning means, and a selective means under control of both registers for directing the setting operation of the conditioning means.

25. A calculating machine according to claim 3, having means conditioned by said reset means upon operation thereof prior to actuation of said operating means to prevent the set of pinions not shifted for positive total taking from being shifted for negative total taking operation.

26. A calculating machine according to claim 25, having a normally ineffective auxiliary pinion shifting means conditioned by said total taking control means for operation by said operating means in a total taking machine cycle and controlled by said highest order pinion controlled means to shift for addition operation the set of pinions not shifted for positive total taking.

27. A calculating machine according to claim 3 having a printing mechanism including a single set of type carriers and means cooperating with said single set of type carriers and with both sets of pinions for indexing said single set of type carriers in accordance with amounts added and subtracted on both sets of pinions and in accordance with totals taken from either set of pinions.

References Cited in the file of this patent

UNITED STATES PATENTS

| | | |
|---|---|---|
| 1,191,695 | Hartley | July 18, 1916 |
| 1,318,798 | Quentell | Oct. 14, 1919 |
| 1,833,467 | Mixer | Nov. 24, 1931 |
| 1,851,401 | Munzer | Mar. 29, 1932 |
| 1,901,153 | Dunker | Mar. 14, 1933 |
| 1,909,549 | Peirce | May 16, 1933 |
| 1,934,747 | Sundstrand | Nov. 14, 1933 |
| 1,950,475 | Bryce | Mar. 13, 1934 |
| 1,957,501 | Horton | May 8, 1934 |
| 2,004,495 | Sundstrand | June 11, 1935 |
| 2,048,453 | Kall | July 21, 1936 |
| 2,066,406 | Lasker | Jan. 5, 1937 |
| 2,088,092 | Ott | July 27, 1937 |
| 2,118,588 | Butler | May 24, 1938 |
| 2,209,240 | Sundstrand | July 23, 1940 |
| 2,214,015 | Dreher | Sept. 10, 1940 |
| 2,226,960 | Anderson | Dec. 31, 1940 |
| 2,277,250 | Nyberg | Mar. 24, 1942 |
| 2,361,714 | Sundstrand | Oct. 31, 1944 |